US 6,702,194 B2

(12) United States Patent
Nakayama et al.

(10) Patent No.: US 6,702,194 B2
(45) Date of Patent: Mar. 9, 2004

(54) FUEL INJECTION METHOD OF A DIRECT INJECTION TYPE INTERNAL COMBUSTION ENGINE, A FUEL INJECTOR, AN INTERNAL COMBUSTION ENGINE, AND A COMBUSTION METHOD

(75) Inventors: Yoko Nakayama, Hitachi (JP); Minoru Ohsuga, Hitachinaka (JP); Toshiharu Nogi, Hitachinaka (JP); Takuya Shiraishi, Hitachinaka (JP); Noboru Tokuyasu, Hitachi (JP); Yoshihiro Sukegawa, Hitachi (JP); Yusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/983,079

(22) Filed: Oct. 23, 2001

(65) Prior Publication Data

US 2002/0020387 A1 Feb. 21, 2002

Related U.S. Application Data

(62) Division of application No. 09/409,848, filed on Oct. 1, 1999, now Pat. No. 6,334,427.

(30) Foreign Application Priority Data

Jan. 10, 1998 (JP) .......................................... 10-279586

(51) Int. Cl.$^7$ ............................................... F02M 47/02
(52) U.S. Cl. ...................... 239/88; 239/533.3; 123/295
(58) Field of Search ............................ 329/88, 89, 91, 329/533.3, 585.5; 123/295, 305, 298

(56) References Cited

U.S. PATENT DOCUMENTS

| 5,108,037 | A | * | 4/1992 | Okamoto et al. | ........... 239/473 |
| 6,102,303 | A | * | 8/2000 | Bright et al. | ............... 239/135 |
| 6,109,543 | A | * | 8/2000 | Bright et al. | ............... 239/135 |
| 6,146,441 | A | * | 11/2000 | Innes | .......................... 75/484 |
| 6,334,427 | B1 | * | 1/2002 | Nakayama et al. | ......... 123/305 |

* cited by examiner

*Primary Examiner*—John Kwon
(74) *Attorney, Agent, or Firm*—Crowell & Moring LLP

(57) ABSTRACT

A combustion chamber is formed using a flat piston having a low cooling loss and therein a forward tumble is generated. A fuel spray is formed by a provision of a splitter which is provided to make off-set from a center of an injection port at a tip end of a tumble atomization system fuel injector. The fuel spray is divided into a fuel spray having a strong penetration force and a fuel spray having a small penetration force. The fuel spray having the strong penetration force is injected in a vicinity of an ignition plug. Accordingly, a fuel adhesion to the piston can be reduced and further a reduction of a discharge HC and a fuel consumption can be improved.

3 Claims, 21 Drawing Sheets

FIG. 1
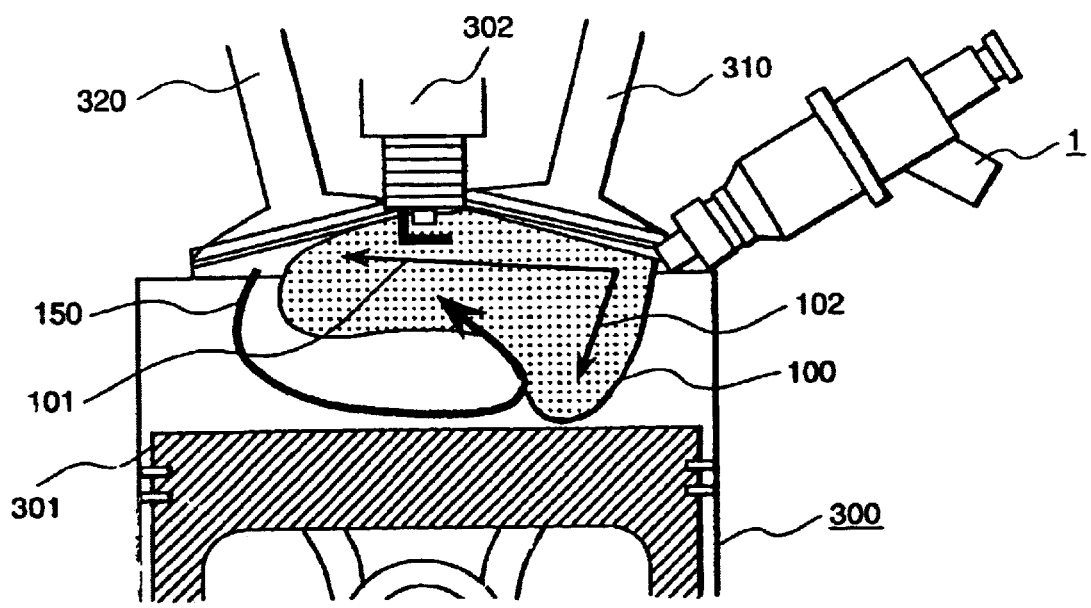
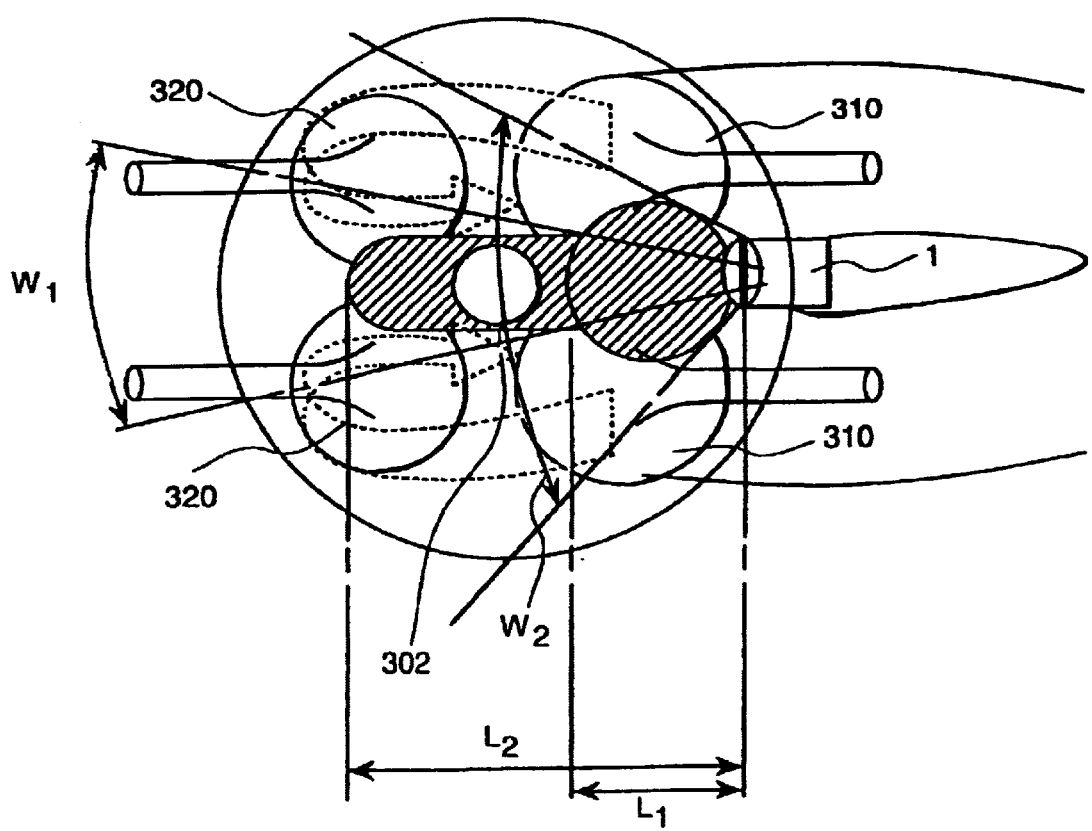

FIG.16
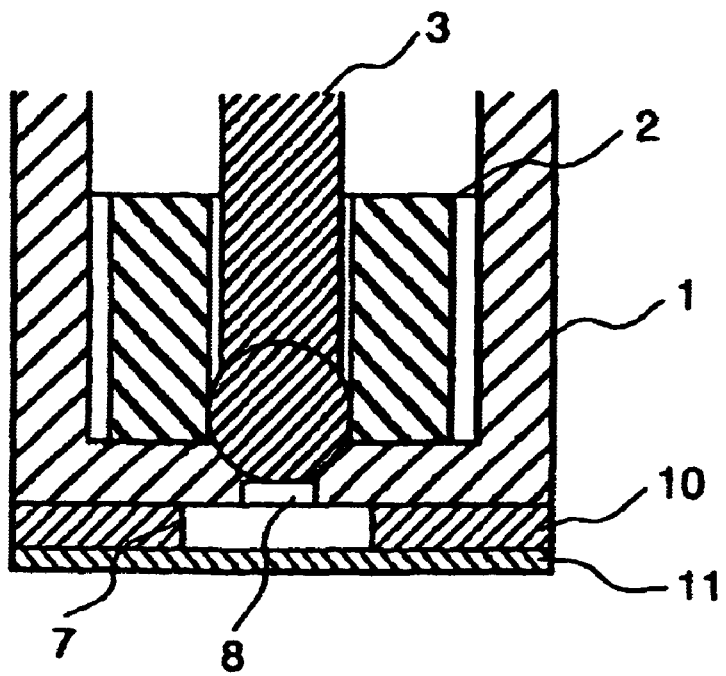
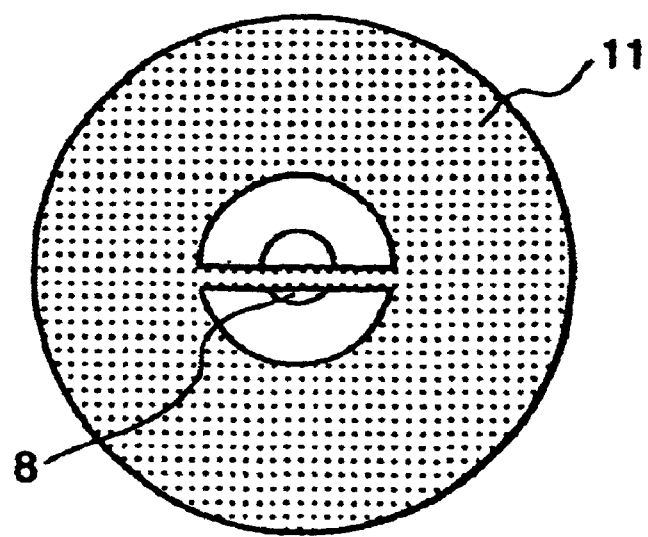

FIG.17
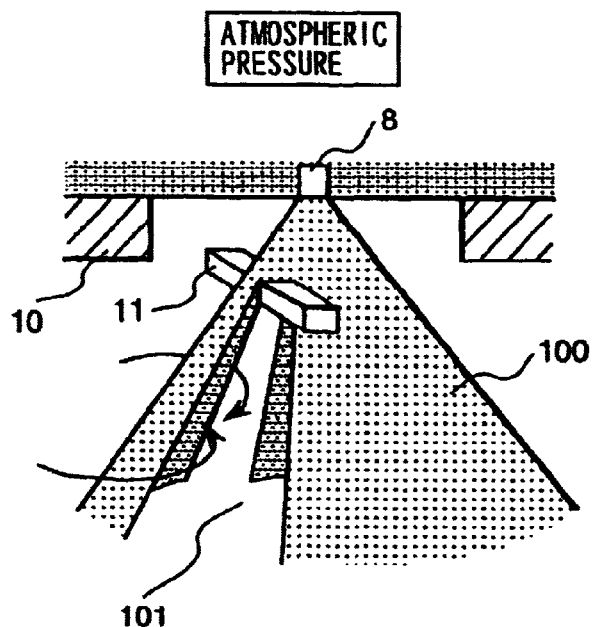
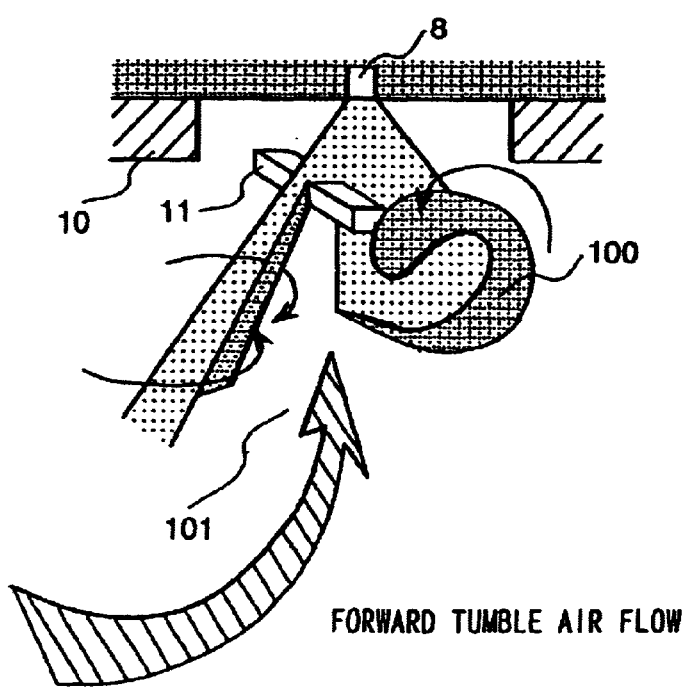
FORWARD TUMBLE AIR FLOW

SPRAY ANGLE $(\alpha) = 2 \times \tan^{-1} \dfrac{W}{2L}$

FIG.22

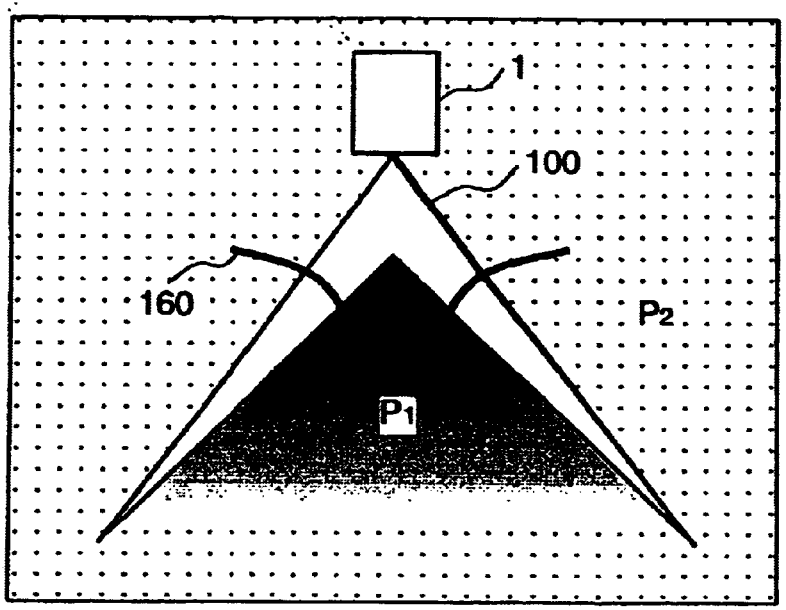

BERNOULLI'S THEOREM $$\frac{\rho v^2}{2} + P + \rho gz = \text{const}$$

$$\frac{\rho v_1^2}{2} + P_1 = \frac{\rho v_2^2}{2} + P_2$$

$$v_2 = 0$$

$$\boxed{P_2 - P_1 = \frac{\rho v_1^2}{2}}$$

EXAMPLE

|  | DENSITY | SPEED |
|---|---|---|
| ATMOSPHERIC PRESSURE | $\rho$ | $v$ |
| PRESSURIZATION | $5\rho$ | $0.8v$ |

ATMOSPHERIC PRESSURE $\quad P_2 - P_1 = \dfrac{\rho v^2}{2} = 1 \times \dfrac{\rho v^2}{2}$ PRESSURIZATION $\quad P_2 - P_1 = \dfrac{5\rho \times (0.8v)^2}{2} = 3.2 \times \dfrac{\rho v^2}{2}$ $$b > 2(x+c)\tan\frac{\alpha}{2} \quad \cdots 1$$

$$e < 2(x+c)\tan\frac{\alpha}{2} \quad \cdots 2$$

$$f < (x+c)\tan\left(\frac{\alpha}{2}\right) - \frac{e}{2} \quad \cdots 3$$

$$x = \frac{a}{2\tan\frac{\alpha}{2}} \quad \cdots 4$$

FIG.26
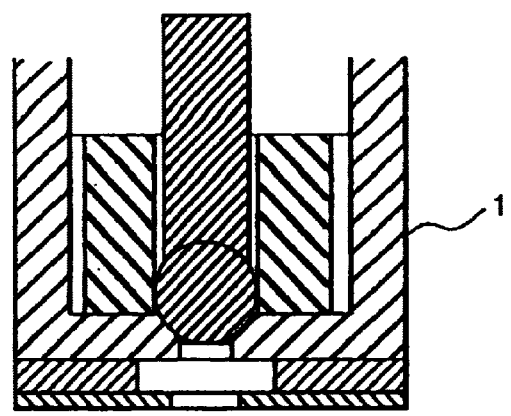
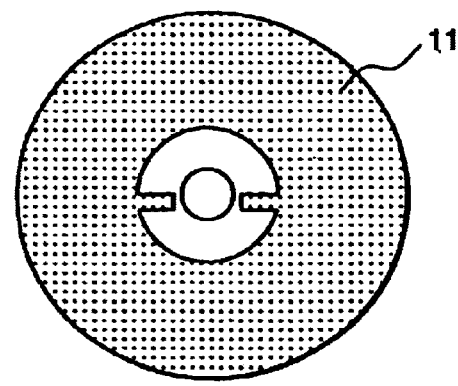
FIG.27
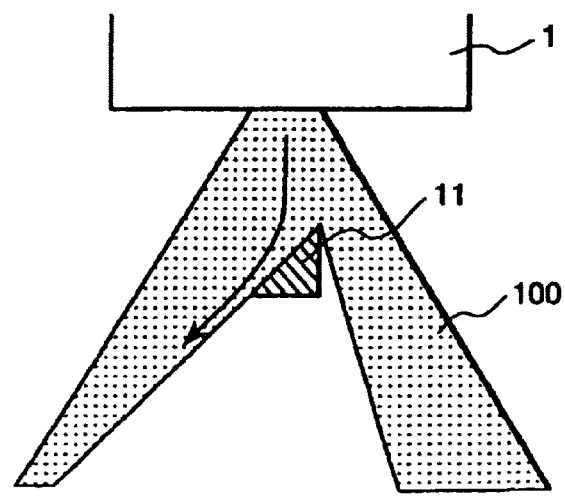

FUEL INJECTION METHOD OF A DIRECT INJECTION TYPE INTERNAL COMBUSTION ENGINE, A FUEL INJECTOR, AN INTERNAL COMBUSTION ENGINE, AND A COMBUSTION METHOD This application is a division of application Ser. No. 09,409,848, filed Oct. 1, 1999 now U.S. Pat. No. 6,334,427.

BACKGROUND OF THE INVENTION

The present invention relates to a technique for supplying directly the fuel into a combustion chamber of an internal combustion engine and particularly to a fuel injection method of a direct injection type internal combustion engine, a fuel injector of a direct injection type internal combustion engine, a direct injection type internal combustion engine, and a combustion method of a direct injection type internal combustion engine.

To improve of a fuel consumption, a stratification lean burn is an important combustion method. To realize the stratification lean burn, it is necessary to gather a rich air-fuel mixture at a vicinity of an ignition plug and a technique relating the about technique shown in, for example, is Japanese application patent laid-open publication No. Hei 6-81651 and Japanese application patent laid-open publication No. Hei 6-81656 has known.

In a technique shown in the above stated Japanese application patent laid-open publication No. Hei 6-81651, a tumble is formed in a cylinder and an injected fuel is collided with a piston and the fuel is guided according to a wall of a cavity and is supported according to the tumble and then the fuel is supplied to an ignition plug.

Further, to form an atomization of the fuel spray it is effective to employ a tumble system fuel injector and the fuel spray during this case is become a hollow conical shape. FIG. 3 shows a prior art to which the above stated technique according to the prior art is combined.

Further, in a technique shown in the above stated Japanese application patent laid-open publication No. Hei 6-81656, a tumble is formed in a cylinder and from a first injection port of a fuel injector the fuel is injected in a direction of an ignition plug and from a second injection port of the fuel injector the fuel is injected in a direction which is along to a flow of the tumble (through an immediately below portion of an air intake valve and aiming to a vicinity immediately below portion of an air exhaust valve and to a slight squint direction against to a horizontal direction of the cylinder), namely the fuel is injected to two directions.

In the above stated conventional fuel injection techniques, it is not taken the consideration about a fuel adhesion to the piston, the wall face of the cylinder or the ignition plug, since the fuel adhesion to the piston is caused, it is not preferable to reduce a discharge HC (a non-combustible hydrocarbon (HC)) according to an incomplete combustion of the adhesion fuel.

SUMMARY OF THE INVENTION

The present invention is devised from the above stated problems and to solve these problems.

An object of the present invention is to provide a fuel injection method of a direct injection type internal combustion engine, a fuel injector of a direct injection type internal combustion engine, a direct injection type internal combustion engine, and a combustion method of a direct injection type internal combustion engine wherein a fuel adhesion amount to the piston can be reduced.

Another object of the present invention is to provide a fuel injection method of a direct injection type internal combustion engine, a fuel injector of a direct injection type internal combustion engine, a direct injection type internal combustion engine, and a combustion method of a direct injection type internal combustion engine wherein a discharge HC can be reduced.

A further object of the present invention is to provide a fuel injection method of a direct injection type internal combustion engine, a fuel injector of a direct injection type internal combustion engine, a direct injection type internal combustion engine, and a combustion method of a direct injection type internal combustion engine wherein a fuel consumption can be improved.

A further more object of the present invention is to provide a fuel injection method of a direct injection type internal combustion engine, a fuel injector of a direct injection type internal combustion engine, a direct injection type internal combustion engine, and a combustion method of a direct injection type internal combustion engine wherein a combustion stability performance can be improved.

A further more object of the present invention is to provide a fuel injection method of a direct injection type internal combustion engine, a fuel injector of a direct injection type internal combustion engine, a direct injection type internal combustion engine, and a combustion method of a direct injection type internal combustion engine wherein a formation of a stratification at the high rotation area can be attained.

To attain the above stated objects, according to the present invention, a fuel injection method of a direct injection type internal combustion engine comprises of the steps of changing a volume of a combustion chamber according to a piston, generating a tumble flow of air in said combustion chamber, dividing a fuel spray into a fuel spray having a strong penetration force and a fuel spray having a small penetration force, and injecting directly the fuel in said combustion chamber to direct said fuel spray having said strong penetration force in a direction of an ignition plug and to direct said fuel spray having said small penetration force in a direction of said piston.

To attain the above stated objects, according to the present invention, a direct injection type fuel injector comprises a fuel passage having a fuel injection port at an end portion, a valve seat provided in a midway of said fuel passage, a valve body for opening and closing said fuel passage by incorporating with said valve seat, a tumble element for giving a tumble force to fuel which passes through between said valve body and said valve seat, and a fuel spray division means having a splitter which is provided on said fuel injection port at a position which is eccentrically from a center of said fuel injection port.

To attain the above stated objects, according to the present invention, a direct injection type fuel injector comprises a fuel passage having a fuel injection port at an end portion, a valve seat provided in a midway of said fuel passage, a valve body for opening and closing said fuel passage by incorporating with said valve seat, a tumble element for giving a tumble force to fuel which passes through between said valve body and said valve seat, a fuel spray division means having a splitter which is provided on said fuel injection port, a portion for opposing said fuel injector port of said splitter is formed with a mountain shape having unequal sides.

To attain the above stated objects, according to the present invention, a direct injection type fuel injector comprises a fuel passage having a fuel injection port at an end portion, a valve seat provided in a midway of said fuel passage, a valve body for opening and closing said fuel passage by incorporating with said valve seat, a fuel enlargement means provided on said fuel injection port and having a hole having a diameter larger than a diameter of said fuel injection port, a fuel guidance means provided on a downstream of said fuel enlargement means and having a slit like hole, a fuel spray means provided at a downstream of said fuel guidance means and having a first slit like hole provided at a rectangular direction against to said slit like hole of said fuel guidance means and a second slit like hole in parallel to said first slit like hole and having a width larger than a width of said first slit like hole.

To attain the above stated objects, according to the present invention, a direct injection type internal combustion engine comprises a combustion chamber for inhaling air through an air intake valve, a piston for varying a volume of said combustion chamber, a tumble flow generation means for generating a tumble flow of the air in said combustion chamber, and a fuel injector being a direct injection type fuel injector for supplying directly a fuel into said combustion chamber and for injecting the fuel by dividing into a first fuel spray having a strong penetration force and a second fuel spray having a small penetration force, said fuel injector is arranged against to said combustion chamber to inject said first fuel spray having said strong penetration force which is injected from said fuel injector in a direction of an ignition plug and to inject said second fuel spray having said small penetration force in a direction of said piston, and according to said tumble flow of the air said first fuel spray having said strong penetration force is guided to a side of said ignition plug.

To attain the above stated objects, according to the present invention, a direct injection type internal combustion engine comprises a combustion chamber for inhaling air through two air intake valves, a piston for varying a volume of said combustion chamber, a tumble flow generation means for generating a tumble flow of the air in said combustion chamber, and a fuel injector provided between said two air intake valves and for supplying directly a fuel to said combustion chamber where said tumble flow of the air is generated, a fuel spray to be injected is divided into a first fuel spray having a strong penetration force and a second fuel spray having a small penetration force, and said first fuel spray having said strong penetration force is injected to a direction of an ignition plug or a vicinity of said ignition plug and said second fuel spray having said small penetration force is injected to a direction of said piston.

To attain the above stated objects, according to the present invention, a fuel combustion method of a direct injection type internal combustion comprises of the steps of: varying a volume of a combustion chamber according to a piston, generating a forward tumble air flow in said combustion chamber, injecting divided a first fuel spray injected to a direction of an ignition plug or a vicinity of said ignition plug and having a strong penetration force and a second fuel spray injected to a direction of said piston and having a small penetration force, by winding up said second fuel spray having the small penetration force from said direction of said piston according to said forward tumble air flow and transporting said second fuel spray having the small penetration force to said direction of said ignition plug, and burning said fuel spray by igniting said ignition plug.

When the fuel spray is observed from a side of the combustion chamber, the spread angle of the fuel spray having the strong penetration force to the peripheral wall of the cylinder is smaller than the spread angle of the fuel spray having the small penetration force to the peripheral wall of the cylinder. As a result, the fuel having the necessary amount can be dispersed at the specific area in the cylinder and without of the lowering of the spark performance, it is possible to carry out the super lean burn operation.

BRIEF DESCRIPTION OF THE DRAWINGS

FIG. 1 is a cross-sectional view showing a formation of a fuel spray in a direct injection type internal combustion engine of one embodiment according to the present invention;

FIG. 16 is a cross-sectional view showing a fuel injector in a direct injection type internal combustion engine of one embodiment according to the present invention;

FIG. 17 is a squint view showing a fuel spray in a direct injection type internal combustion engine of one embodiment according to the present invention;

FIG. 22 is an explanatory view showing a fuel spray angle variation in a direct injection type internal combustion engine of one embodiment according to the present invention;

FIG. 26 is a cross-sectional view showing a fuel injector in a direct injection type internal combustion engine of one embodiment according to the present invention;

FIG. 27 is an arrangement view showing a splitter structure in a direct injection type internal combustion engine of one embodiment according to the present invention;

DESCRIPTION OF THE INVENTION

Figure 2:
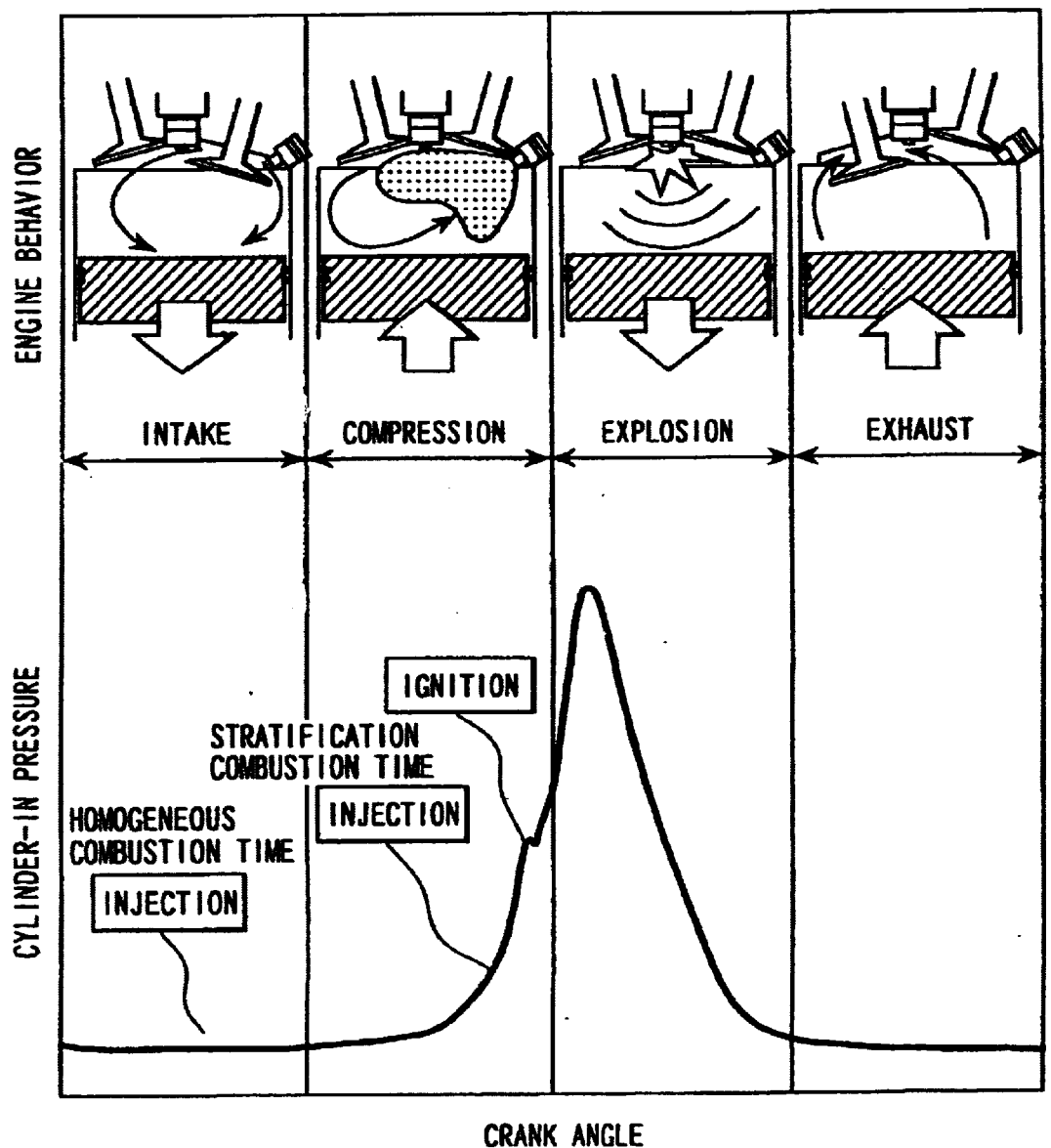
FIG. 2 is an explanatory view showing an engine operation of one embodiment according to the present invention in which an engine behavior and a direct pressure are shown in a vertical axis and a crank angle is shown in a horizontal axis.

One embodiment of a fuel injection method of a direct injection type internal combustion engine, a fuel injector of a direct injection type internal combustion engine, a direct injection type internal combustion engine, and a combustion method of a direct injection type internal combustion engine according to the present invention will be explained referring to FIG. 1.

In FIG. 1, a piston 301 of a direct injection type of an internal combustion engine 300 has a flat form piston having no cavity and a tumble flow 150 in a combustion chamber is a forward tumble which is flown from an intake valve and is directed to an exhaust valve and the piston 301.

The fuel injector 1 is arranged between two intake valves 310 with about 40 degree from a horizontal portion. A fuel spray 100 has a strong penetration force 101 in a direction of an ignition plug and a weak penetration force 102 in a direction of the piston 301. A method of forming the fuel spray 100 will be explained in a latter portion.

An operation of the engine 300 will be explained referring to a waveform of a combustion pressure of FIG. 2. The engine 300 is operated using a set of four strokes comprised of an air intake, a compression, an explosion, and an air exhaust in accordance with an up and down motion of the piston 301. In the air intake stroke, the air intake valve 310 is opened, and the air is flown into the combustion chamber together with a descent of the piston 301.

In this case, by a provision of a mechanism for controlling the flow to an upstream of the intake valve 310, a strong forward tumble is formed in the combustion chamber. When the engine 300 is entered into the compression stroke, since both the air intake valve and the air exhaust valve are closed and then the piston 301 is ascended and the air in an inside portion of the combustion chamber is compressed and then a pressure in the combustion chamber is risen.

In an immediately before a finish of the compression stroke the ignition is carried out, and the explosion stroke is begun and then the pressure in the combustion chamber is risen abruptly and by pressing this pressure the piston 301 is descended and the work is down. In the air exhaust stroke at the final stroke, the air exhaust valve is opened and then the piston 301 is ascended, as a result a combustion gas in the combustion chamber is discharged.

In the direct injection type internal combustion engine, the combustion method is classified mainly two combustion methods which are comprised of a stratification injection combustion method and a homogenous injection combination method.

The stratification injection combustion is a combustion method in which, during a pressurization atmosphere at a latter half of the compression stroke the fuel is injected and a combustible air-fuel mixture is gathered at a vicinity of the ignition plug and the fuel spray is made the stratification and ignited. Since the fuel spray is formed the stratification, as a whole combustion chamber, under a lean fuel spray state having an air-fuel ratio about 40 degree the combustion is carried out, as a result the fuel consumption can be improved.

On the other hand, the homogenous injection combination is a combustion method in which during the air intake stroke the fuel is injected and the fuel is mixed homogeneously and ignited. As a whole combustion chamber, since the fuel is injected to have the air-fuel ratio to be a stoichiometric air-fuel ratio degree, in comparison with the stratification lean burn, the high output operation can be carried out.

Figure 3:
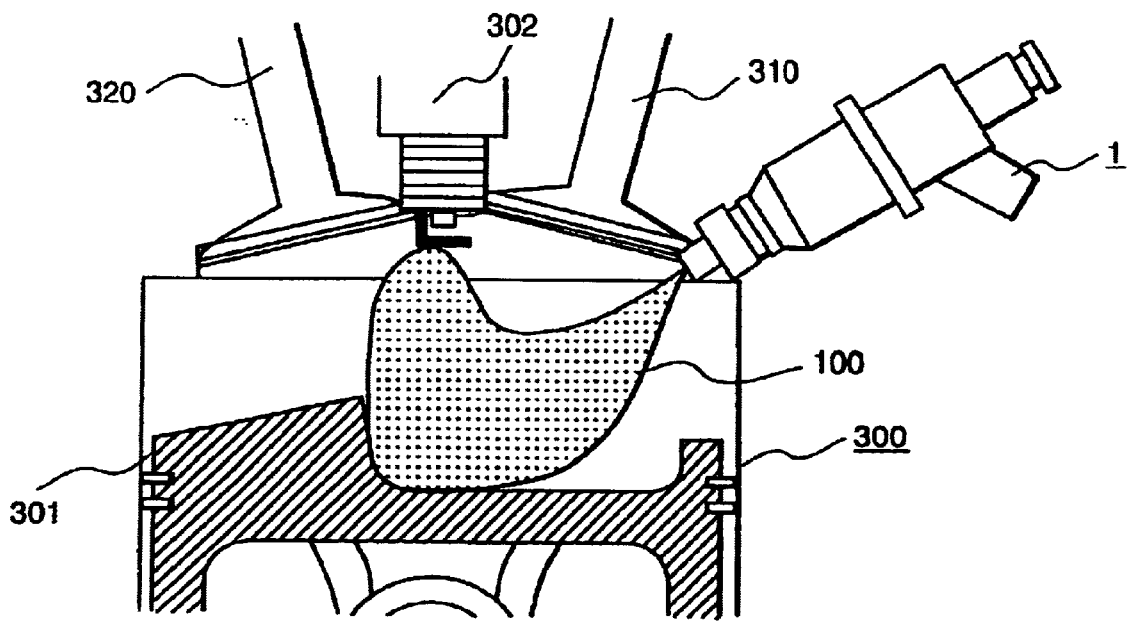
FIG. 3 is a cross-sectional view showing a formation of a fuel spray in an internal combustion engine according to the prior art.

FIG. 3 is a view in which the hollow conical fuel spray according to the prior art is injected to the pressurization atmosphere. In this case, the compact fuel spray (FIG. 19(b)) having a narrow fuel spray angle is formed. In this fuel spray, when the fuel spray is collided with the cavity piston and is formed the stratification, there is a merit in which the fuel spray is received in the cavity and is formed easily the stratification.

Figure 4:
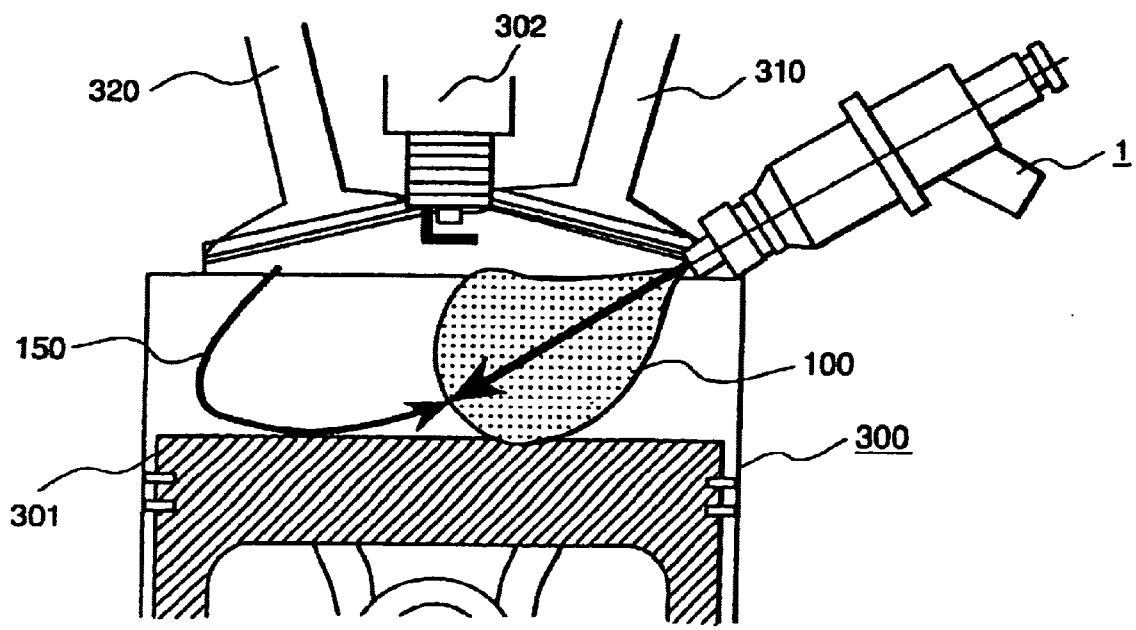
FIG. 4 is a cross-sectional view showing a formation of a fuel spray in an internal combustion engine according to the prior art.

However, in the flat piston as shown in FIG. 4, since the fuel spray is collided with a forward tumble flow 150 and is interfered, it is difficult to form the stratification.

Figure 5A:
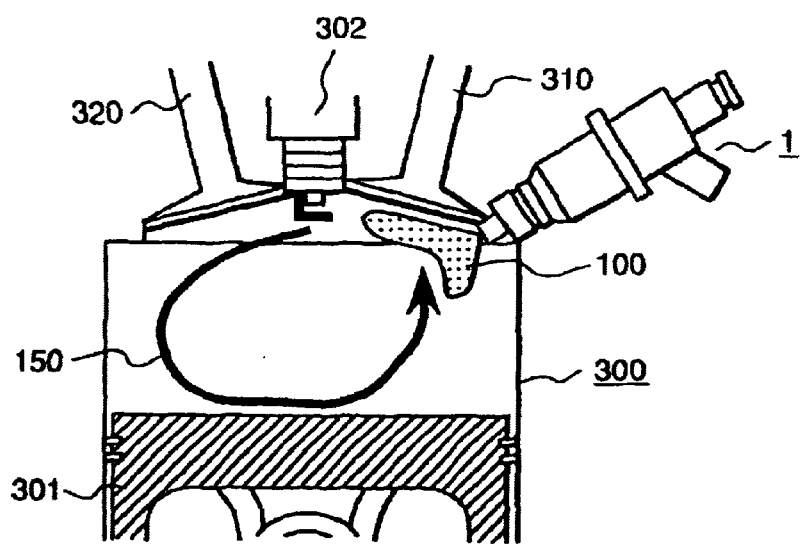
FIG. 5 is view showing a relationship between a fuel spray and a tumble flow in a direct injection type internal combustion engine of one embodiment according to the present invention.
Figure 5B:
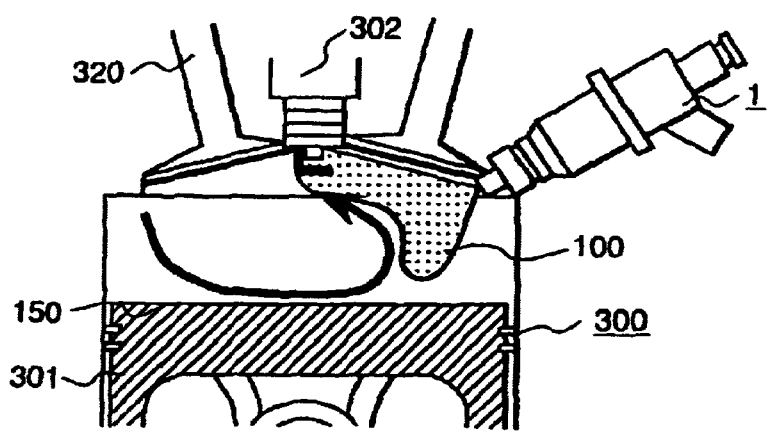
Figure 5C:
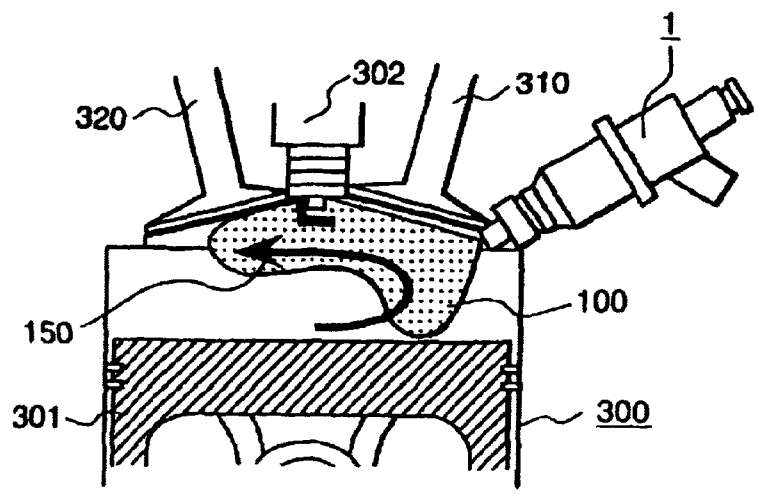

In FIG. 5, the fuel spray 100 shown in FIG. 1 is applied to the direct injection type internal combustion engine having the flat piston and further FIG. 5 shows a relationship between the engine state and the tumble (the forward tumble). First of all, the tumble flow 150 is introduced into the inside portion of the fuel spray 100 (FIG. 5(A)).

The fuel spray 100 which has the strong penetration force and is injected to direct in a direction of the ignition plug or in the surrounding portion of the ignition plug can be reached to the vicinity of the ignition plug without a support of the tumble. However the fuel spray 100 is supported to the reach to the ignition plug according to the tumble and is ridden on the tumble and is transported to the ignition plug (FIG. 5(B)).

Further, as to the spray which is injected to a direction of the piston, since the tumble is become as the resistance and the force for directing the piston is restrained and the reach of the fuel is obstructed, the fuel adhesion to the piston can be reduced. The fuel spray in which the penetration force is weakened in the piston direction is wound up by the tumble and is transported to the ignition plug (FIG. 5(C)).

In this case, the fuel spray is observed from an upper portion of the combustion chamber, as shown in the lower side figure of FIG. 1, a spread angle of the fuel spray having the strong penetration force in the peripheral wall direction of the cylinder is expressed by W1 and a spread angle of the fuel spray having the small penetration force is expressed by W2.

In this case, the spread angle W1 is substantially a spray angle which is received between two air exhaust valves system, and the spread angle W2 is substantially a spray angle which is received between two air intake valves system and the relationship between these spray angles is that W1/W2=1/3 degree.

The spread angle W1 of the fuel spray having the strong penetration force is preferable to have a small value in which the fuel spray is not too much dispersed in the combustion chamber. Since the spread angle W2 of the fuel spray having the small penetration force is broaden but has not enough penetration force, the fuel spray is formed the compact one. As a result, the fuel adhesion amount to the wall face of the combustion chamber can be restrained.

In the technique shown in the above stated Japanese application patent laid-open publication No. Hei 6-81656, since the fuel spray is ridden on the tumble which directs for the piston direction and then the fuel spray is transported to the piston direction, there is not taken about the consideration about the fuel adhesion to the piston.

However, the structure according to the present invention shown in FIG. 5, the tumble is used as the resistance (the brake) of the fuel which is injected to the piston direction, the above stated fuel adhesion to the piston shown in the prior art can be reduced.

Figure 6:
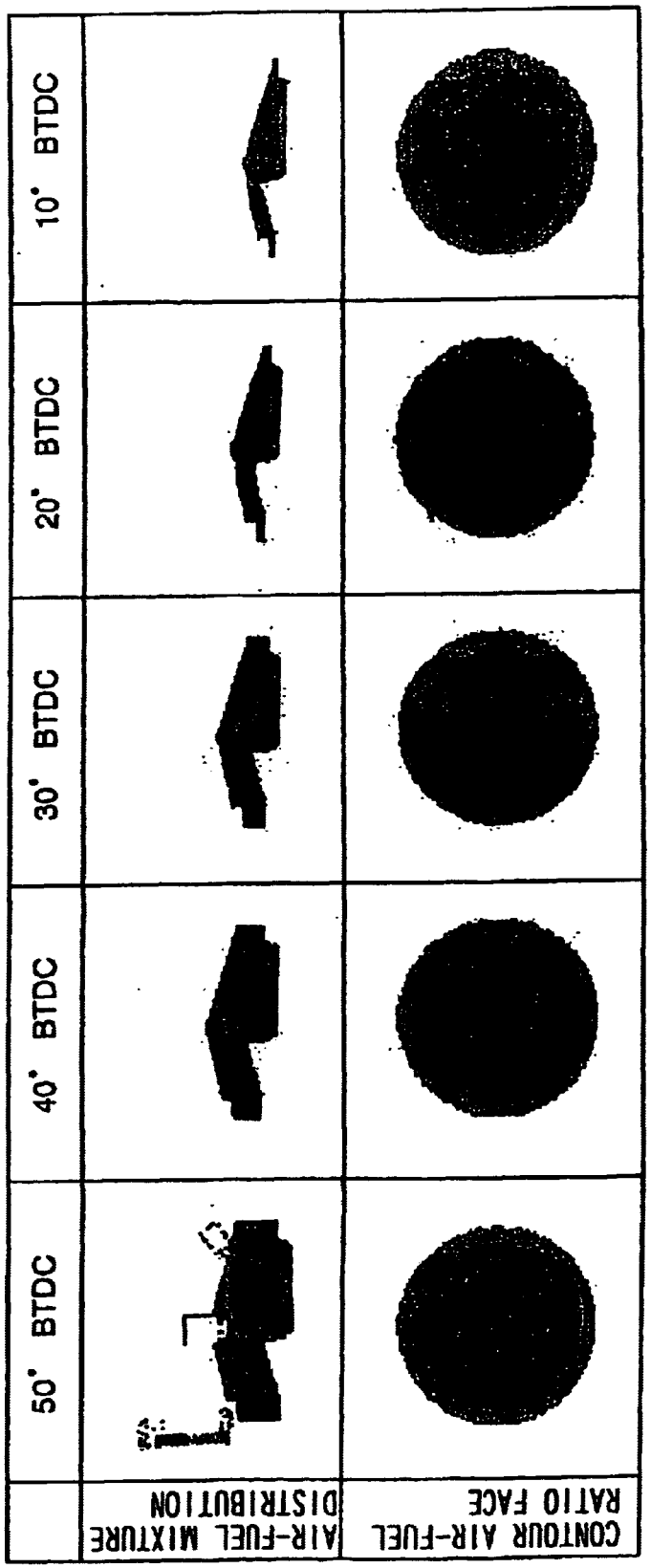
FIG. 6 is a view showing a result of an air-fuel mixture distribution calculation in an internal combustion engine according to the prior art.

FIG. 6 shows a result of simulation of the behavior of the air-fuel mixture in a case where the hollow conical fuel spray according to the prior art is applied to the internal combustion engine using the piston having the cavity according to the prior art. The calculation conditions are that rotation number is 1400 rpm and the air-fuel ratio is 40.

The fuel spray which has collided with the wall face of the piston cavity is pushed up to the vicinity of the ignition plug together with the ascent of the piston, at 20° BTDC the air-fuel mixture is reached finally to the ignition plug.

Figure 7:
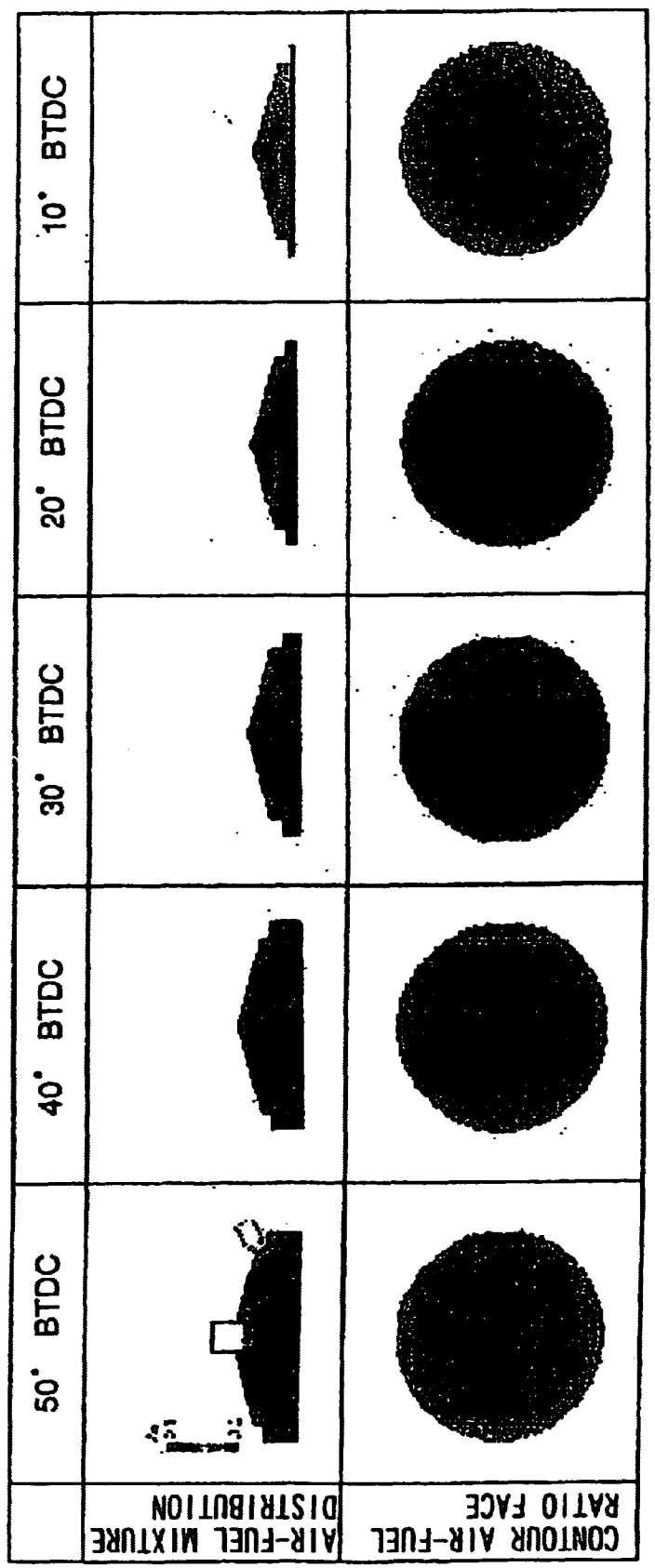
FIG. 7 is a view showing a result of another air-fuel mixture distribution calculation in a direct injection type internal combustion engine of one embodiment according to the present invention.

FIG. 7 shows a result of simulation of the behavior of the air-fuel mixture in a case where the fuel spray having the shape nearly to the fuel spray 100 is applied to the flat piston. The calculation conditions are the same shown in FIG. 6.

The fuel spray having the strong penetration force which is directed for the ignition plug direction is reached to the ignition plug together with the fluidity of the forward tumble and, it can be understood that when the time lapses, according to the tumble which is entered into between the fuel spray and the flat piston, the fuel spray having the small penetration force which is injected to the piston direction is reached to the ignition plug.

In other words, from the immediately after the injection (40° BTDC) the air-fuel mixture is reached to the ignition plug and extending over the long time to TDC the air-fuel mixture can be formed the stratification at the surrounding portion of the ignition plug.

Figure 8:
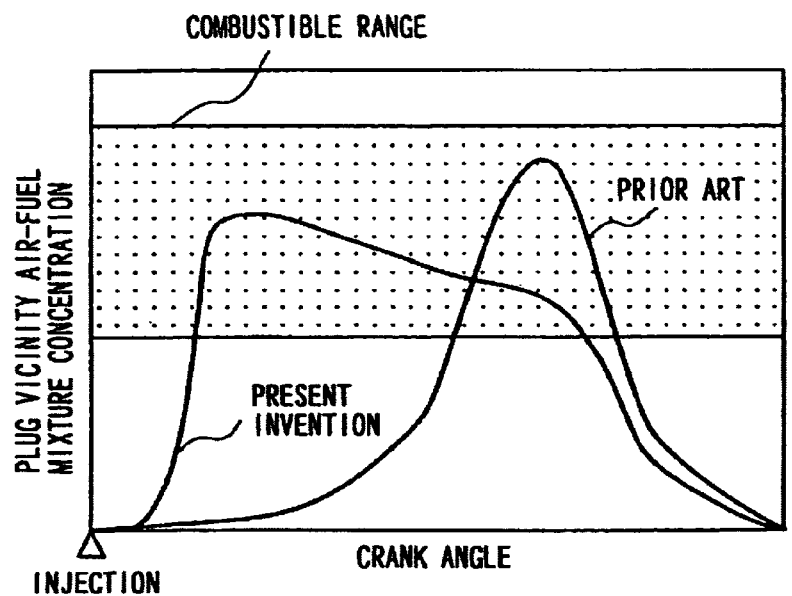
FIG. 8 is a graph showing a variation of an air-fuel ratio at a vicinity of an ignition plug of one embodiment according to the present invention and according to the prior art in which an air-fuel mixture concentration is shown in a vertical axis and a crank angle is shown in a horizontal axis.

FIG. 8 shows a relationship between the crank angle and the concentration of the air-fuel mixture at the vicinity of the ignition plug. In FIG. 6 (the prior art), the concentration of the air-fuel mixture at the vicinity of the ignition plug has a peak having a narrow range against to the crank angle and it is necessary to be ignited at the short time in which the concentration is entered to the combustible range.

On the other hand, in FIG. 7 (the present invention), since the concentration of the air-fuel mixture at the vicinity of the ignition plug is existed at the combustible range extending over the long time, it can be afforded the ignition timing (namely, the freedom about the selection of the optimum ignition timing can be given).

Figure 9:
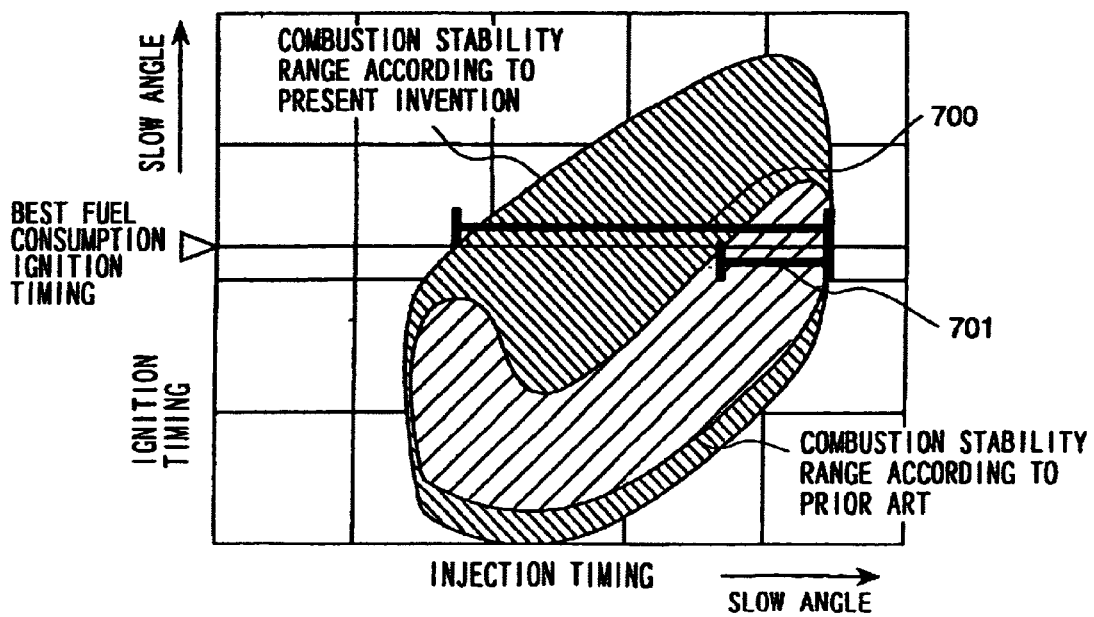
FIG. 9 is a view showing a combustion stability range of one embodiment according to the present invention and according to the prior art in which an ignition timing is shown in a vertical axis and an injection timing is shown in a horizontal axis.

FIG. 9 shows a combustion stability range in a case where the injection timing is shown in the horizontal axis and the ignition timing is shown in the vertical axis.

In the internal combustion engine according to the prior art, a combustion stability range 701 at the ignition timing where the fuel consumption is become the optimum is very narrow. For this reason, to response the mechanical error in the injector and the change of the conditions of the change in the time lapse etc., it is difficult to be made stable the combustion.

Further, when the rotation number becomes high it is necessary to lengthen the crank angle from the injection to the ignition. For this reason, it is considered that according to the rise of the rotation number the move of the piston is become rapidly and further the rise of the atmosphere pressure the speed of the fuel spray is become slowly.

On the other hand, according to the present invention, a combustion stability range 700 is become widely and even the conditions of the fuel spray etc. are fluctuated, it is possible to carry out the stable combustion. Further, in regardless the rotation number of the engine, it is possible to carry out the stable combustion.

Figure 10:
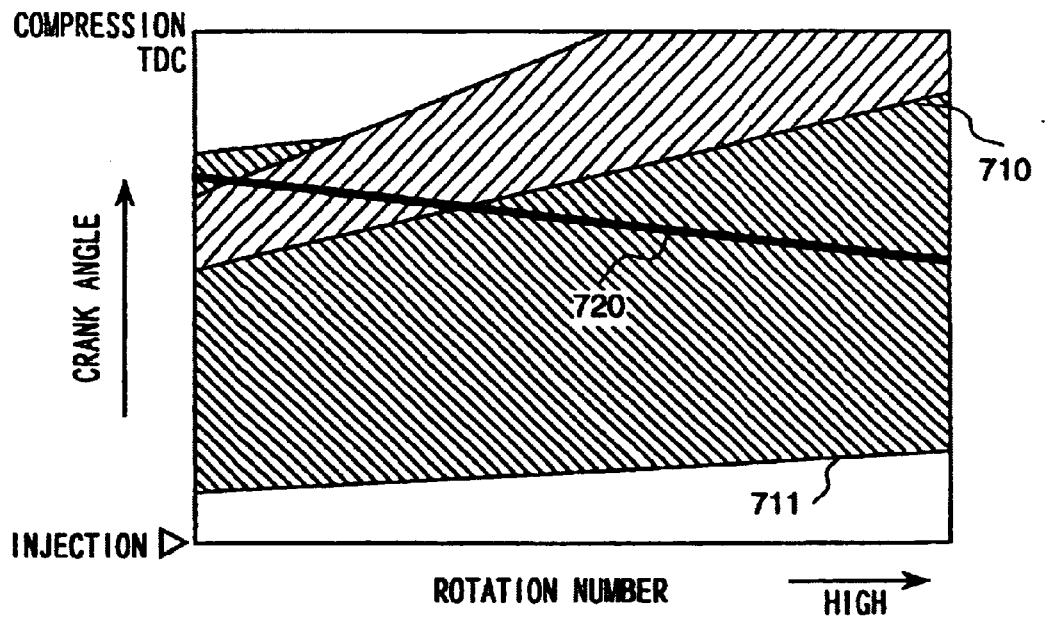
FIG. 10 is a view showing a relationship between a rotation number and a fuel consumption of one embodiment according to the present invention and according to the prior art in which a crank angle is shown in a vertical axis and a rotation number is shown in a horizontal axis.

In FIG. 10, the rotation number is shown in the horizontal axis and the crank angle is shown in the vertical axis, and FIG. 10 shows an area in which the combustible air-fuel mixture is existed at the vicinity of the ignition plug from the injection to the compression TDC.

In the technique according to the prior art, the area 710 in which the combustible air-fuel mixture is existed is narrow and when the rotation number is risen since the combustible air-fuel mixture is not reached to the vicinity of the ignition plug as far as it is reached to the vicinity of the compression TDC, it can not be ignited at the ignition timing having the good fuel consumption.

On the other hand, in the technique according to the present invention, similarly to that of the prior art by the rise of the atmosphere pressure the fuel spray speed is become slowly, however together with the rise of the rotation number according to the forward tumble the flow of the fuel spray is supported, and as a result the time for reaching to the fuel spray to the ignition plug is hardly received the affect of the rotation number (confer a reference numeral 711).

Further, since the time in which the air-fuel mixture is formed the stratification is long, as shown in FIG. 7, as shown in FIG. 10 the combustible air-fuel mixture is formed the stratification at the vicinity of the ignition plug with the wide area against to the rotation number and the crank angle, as a result the combustible stability performance can be improved. Further since the optimum ignition timing for the fuel consumption can be selected, the fuel consumption can be improved.

Figure 11:
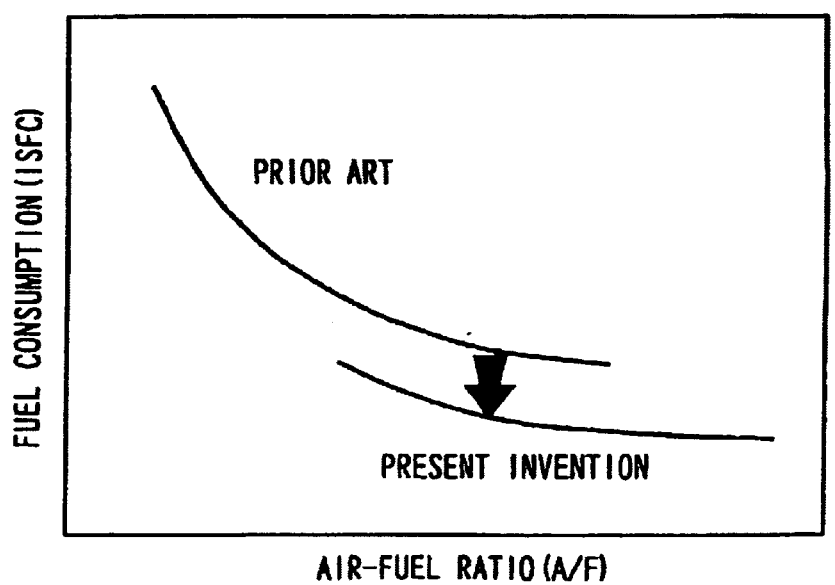
FIG. 11 is a view showing an air-fuel ratio and a fuel consumption of one embodiment according to the present invention and according to the prior art.

FIG. 11 is a view showing a relationship between the fuel consumption and the air-fuel ratio in comparison with the engine having the cavity piston according to the prior art.

According to the present invention, since the fuel is directed directly to the ignition plug, the efficiency for the stratification is good in comparison with that of the prior art, and the stable combustion can be carried out at the large air-fuel ratio (A/F) area (the good fuel consumption area).

Further with the same air-fuel ratio as stated in above since the ignition timing in which the optimum fuel consumption is obtained can be selected, the fuel consumption can be improved at the whole area of the air-fuel ratio. Further, since the fuel is not guided according to the piston, the fuel adhesion to the piston can be reduced and also the discharge HC according the non-combustible combustion can be reduced.

Figure 12:
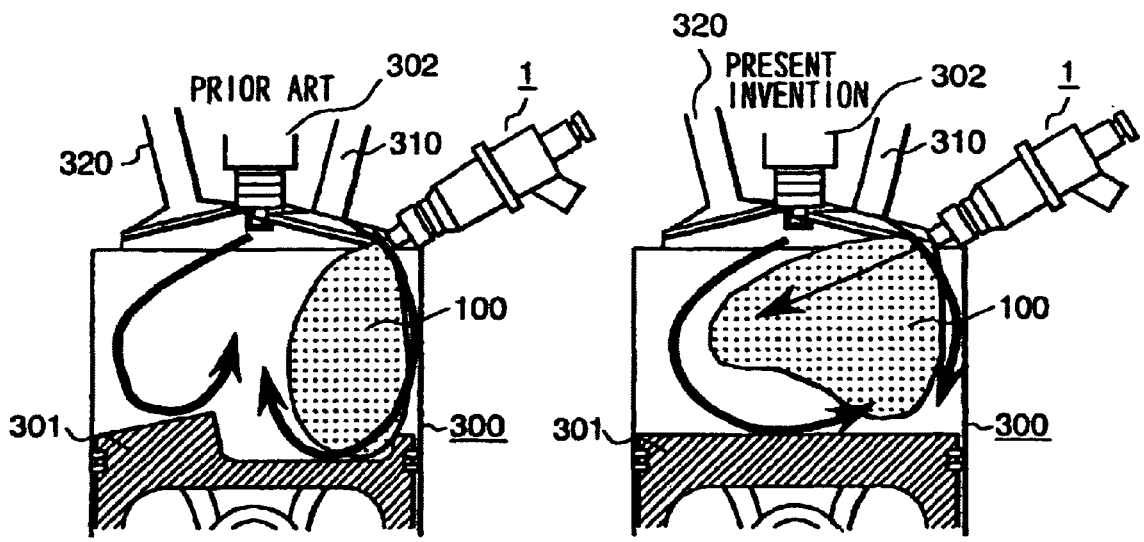
FIG. 12 is a cross-sectional view showing a formation of a fuel spray in an internal combustion engine of one embodiment according to the present invention and according to the prior art.

FIG. 12 is a view in which the state in the combustion chamber during the homogeneous operation time. In the high rotation number and the high output time which are carried out according to the homogenous combustion, it is necessary to inject the fuel in the strong tumble flow during the air intake stroke.

In the prior art, to form the hollow conical fuel spray the cavity piston is used, and as shown in the left figure in FIG. 12, a twin vortex is formed in the combustion chamber. As a result, the injected fuel is flown and gathered at the intake side of the combustion chamber and is not mixed homogeneously, and then there is a defect in which the output is not risen.

On the other hand, according to the present invention, since the flat piston (or with a form where the forward tumble is not obstructed the piston having the cavity can be employed) is used, the tumble flow is not obstructed according to the piston, as a result extending over the whole combustion chamber the forward tumble can be formed.

The flow for directing to the immediately below from the air intake valve, since the fuel spray having the strong penetration force is used, the fuel spray is overcome the tumble flow and as a result at the whole combustion chamber the air-fuel mixture can be distributed.

Figure 13:
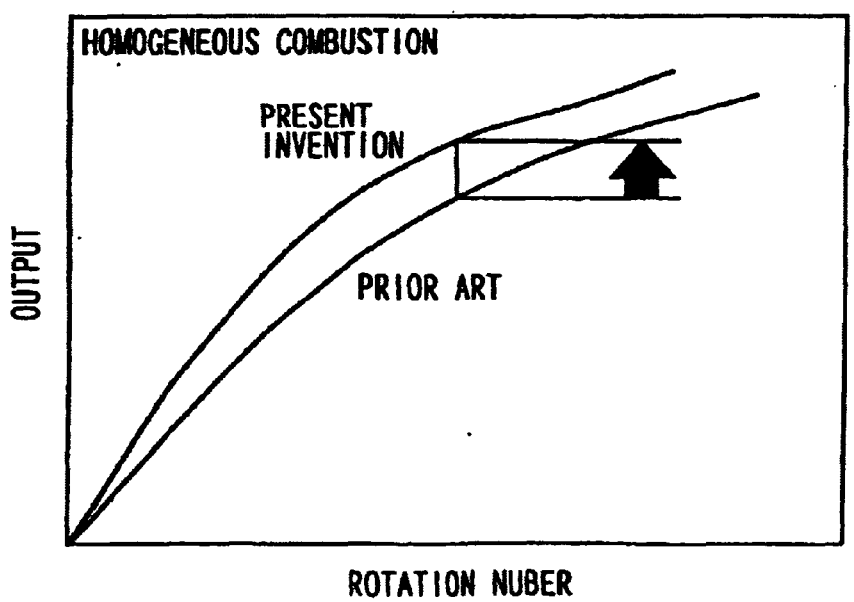
FIG. 13 is a view showing a relationship between a rotation number and an output of one embodiment according to the present invention and according to the prior art.

As stated in above, according to the present invention, since the air-fuel mixture is mixed homogeneously in the whole combustion chamber, the output improvement can be improved as shown in FIG. 13.

Further, according to the present invention, together with the rotation number is risen, the air fluidity is become strong, however further the injection period is become long, the penetration force of the fuel spray is increased and also the mixing is promoted. As a result, according to the present invention even the rotation number is risen, the effect of the output improvement can be maintained.

A case where to the piston having the cavity shown in the left figure of FIG. 12 the direct injection type fuel injector according to the present invention is used will be considered. According to the present invention, since the fuel spray is divided into, the fuel spray for directing for the piston direction is become to have small amount in comparison with that of the prior art and the fuel adhesion to the piston can be reduced.

Further, since the fuel spray having the strong penetration force and which is directed for the ignition plug is opposed against the flow which is directed to the immediately below from an air intake port, the mixing with the air is promoted and in the combustion chamber the fuel spray is mixed homogeneously in comparison with the structure according to the prior art and as a result the effect of the output improvement can be obtained.

Figure 14:
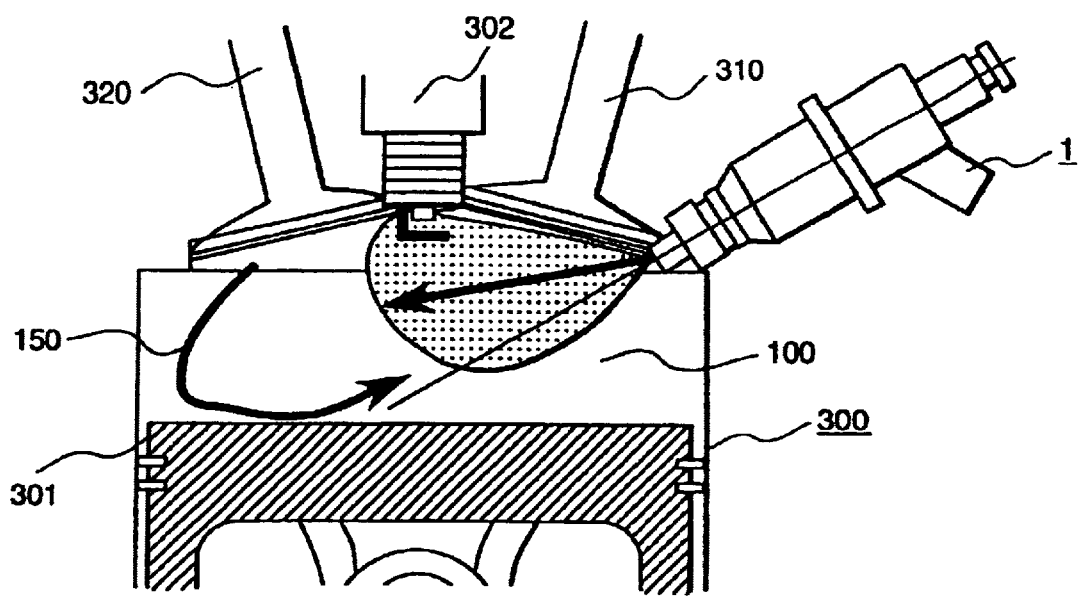
FIG. 14 is a cross-sectional view showing a formation of a fuel spray in a direct injection type internal combustion engine of one embodiment according to the present invention.

FIG. 14 shows an example in which the fuel spray is formed strong to the ignition plug but is formed weak to the piston direction by deflecting the hollow conical fuel spray. Under the pressurization atmosphere the compact spray shape (FIG. 19($b$)) is formed and further since a part of the fuel spray can be reached to the vicinity of the ignition plug by the assistance of the tumble, the ignition performance can be improved in comparison with that of the prior art. Further, since the penetration force of the fuel spray is small, the fuel adhesion to the piston can be reduced.

Figure 15:
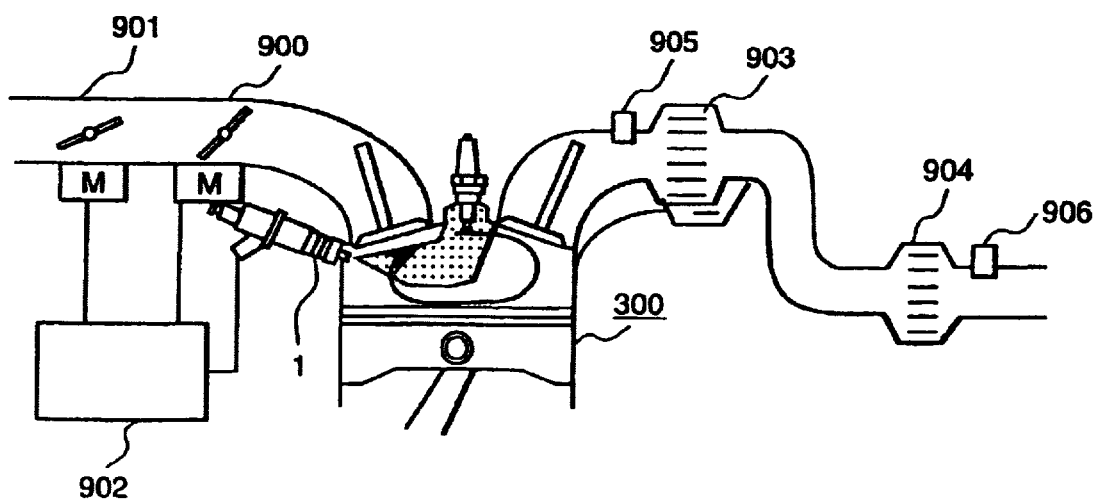
FIG. 15 is a view showing an engine system in a direct injection type internal combustion engine of one embodiment according to the present invention.

FIG. 15 shows an engine system according to the present invention. An electronically controlled throttle valve 901 controls with the high accuracy the air amount of the air which has passed through an air cleaner not shown in figure. At a downstream of the throttle valve 901, a tumble flow generation mechanism 900 is provided. By electronically controlling this tumble flow generation mechanism 900 the tumble flow which is suited to the operation condition can be generated in the combustion chamber.

These valves and the fuel injector 1 are controlled in accordance with an engine control unit (ECU). To an air exhaust pipe, a three element catalyst 903 used in the port injection according to the prior art and a lean NOx catalyst 904 for removing NOx which is generated mostly in the lean burn having the large air-fuel ratio. Reference numerals 905, 906 are $O_2$ sensor and A/F sensor.

FIG. 16 is a longitudinal cross-sectional view and a bottom view showing the vicinity of the fuel injection port 8 of the fuel injector 1. A tip end of the fuel injector 1 is comprised of a valve seat 7 for controlling the fuel injection amount by incorporating with a valve body 3, a fuel tumble element 2 for giving the tumble force to the fuel, a splitter 11 for dividing the fuel spray, and a spacer for supporting the splitter 11. The splitter 11 is arranged to have an eccentric amount (an off-set) from a center of the injection port 8.

A motion of this fuel injector 1 according to the present invention will be explained. In commonly, the valve body 3 is pressed to the valve seat 7 and seals the fuel which is flown from an upper portion. When an injection signal is inputted, the valve body 3 is risen and a gap is formed between the valve body 3 and the valve seat 7, and when the injection signal is broken off then the valve body 3 is returned on the valve seat 7.

Next, the flow of the fuel will be explained. The fuel is flown to the fuel injector 1 under a constant pressure from the upper portion and is reached to the fuel tumble element 2. According to the injection signal, the valve body 3 is risen the fuel is started to flow and then the injection is started.

The fuel is given the tumble force according to the fuel tumble element 2 and the fuel spray which is injected from the injection port 8 is become a hollow conical shape fuel spray. Since the fuel spray is passed through the spacer 10 and is collided with the splitter 11, a part of the hollow conical shape fuel spray is cut off and an air passage 101 to the inside portion of the fuel spray is formed (FIG. 17).

An upper figure in FIG. 17 is a view showing a case where the atmosphere pressure is the atmospheric pressure. As shown in this figure, when the air passage 101 is formed, the difference between the inner pressure and the outer pressure of the fuel spray is gotten off, and then the fuel spray is flied to the injection direction.

Figure 18A:
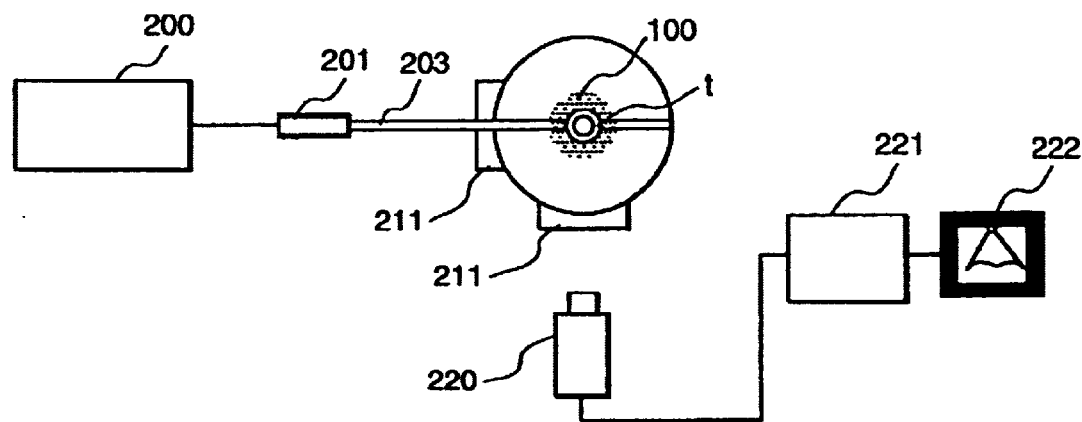
FIG. 18 is a view showing a fuel spray photography apparatus in a direct injection type internal combustion engine of one embodiment according to the present invention.
Figure 18B:
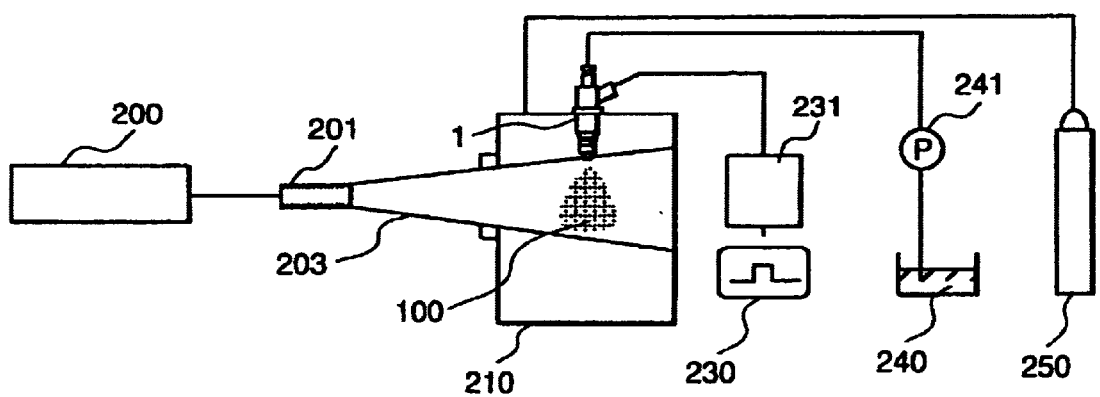

FIG. 18 shows a photography apparatus system. FIG. 18(a) is a plan view and FIG. 18(b) is a side face view. To a vessel 210 having the pressure proof about 1 MPa the fuel injector 1 is installed, and in the interior portion of the vessel 210 the fuel is injected.

A sheet form 203 is formed according to an optical system 201 using two cylindrical lens by an Ar gas laser 200 having an output 3W and by passing through an acrylic material made window 211 of the pressure proof vessel 210 this sheet is irradiated to a cross section including a center axis of the fuel injector 1.

A scattering light of the laser according to the fuel spray 100 is photographed at a shutter speed 4500 coma/sec using a high speed video camera 200 which is arranged at a rectangular direction with a plane face of the Ar gas laser 200. A photographed picture image is displayed to a monitor 222 through a main body 221 of the high speed video camera 220.

By synchronizing the injection signal (1 ms) from a pulse generator 230 the high speed video camera 220 is started to photograph and the fuel injector 1 is driven by a drive circuit 231 and the fuel is injected. The fuel is pressurized by a pump 241 from a fuel tank 240 and the fuel is sent to the fuel injector 1.

The fuel spray in case where in the pressure proof vessel 210 the pressurization atmosphere of the compression stroke is simulated to have 0.5 MPa (an absolute pressure) and in a case where in the pressure proof vessel 210 the injection of the air intake stroke is simulated to have 0.1 MPa (the atmospheric pressure) is observed. To the interior portion of the pressure proof vessel 210, taking into the consideration about the stability a nitrogen gas 250 is filled up.

FIG. 19 shows a fuel spray photography of the tumble system injector according to the prior art, and FIG. 20 shows a fuel spray photography (the off-set amount of the splitter= zero (0)) according to the present invention.

Figure 19A:
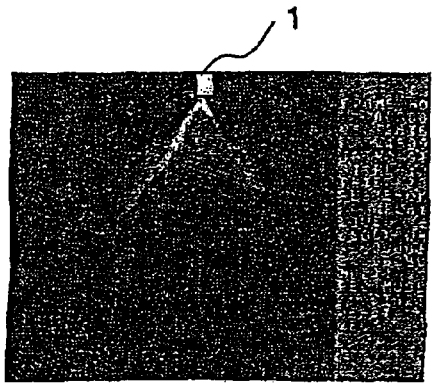
FIG. 19 is a view showing a cross-section shape showing the photography of a fuel spray of one embodiment according to the prior art.

In actually, as the splitter 11 a plate having a width of 2 mm degree and a height of 0.5 mm degree is provided at a position under 2 mm of the injection port 8. FIG. 19(a) is a case of the atmosphere pressure of 0.1 MPa and is a fuel spray shape after about 1.8 ms from when the injection is started.

Figure 19B:
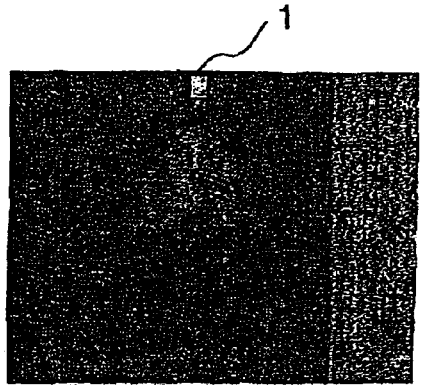

FIG. 19(b) is a case of the atmosphere pressure of 0.5 MPa and is a fuel spray shape about 4.0 ms from when the injection is started and in this fuel spray the characteristic of the fuel spray is become clearly.

It is understood that the fuel spray according to the prior art has the hollow conical shape fuel shape (FIG. 19(a)) under the atmospheric pressure and under the pressurization atmosphere by the entrainment of the air to the inside portion of the fuel spray the fuel spray has the compact fuel spray shape.

Figure 20A:
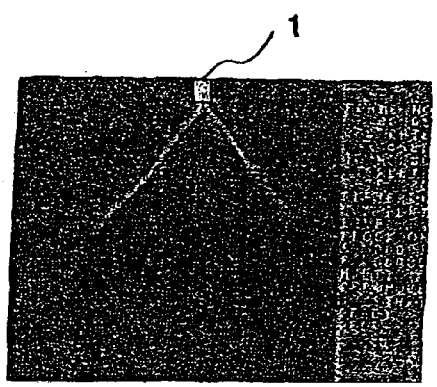
FIG. 20 is a view showing a cross-section shape showing the photography of a fuel spray in a direct injection type internal combustion engine of one embodiment according to the present invention.
Figure 20B:
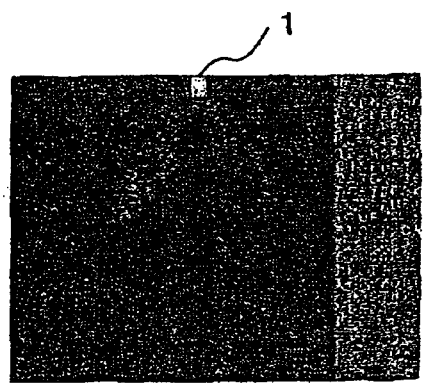

On the other hand, the fuel spray according to the present invention has the hollow shape fuel spray as shown in FIG. 20(a) under the atmospheric pressure and it is understood that in this fuel spray the fuel spray and is wide and the penetration force is strong in comparison with the those of the prior art. Under the pressurization atmosphere (FIG. 20(b)), the pressure is become as the resistance the diffusion of the fuel spray and the fuel spray angle is wide similar to that of the atmospheric pressure.

Figure 21A:
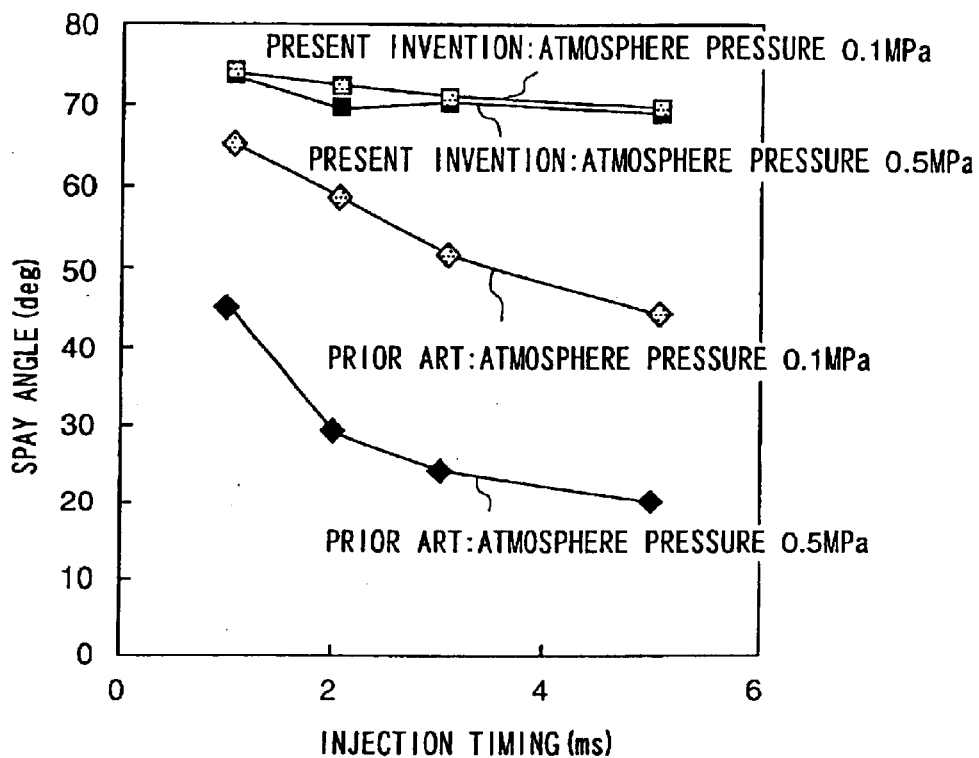
FIG. 21 is a view showing a relationship between an injection period and a fuel spray angle of one embodiment according to the present invention and according to the prior art.
Figure 21B:
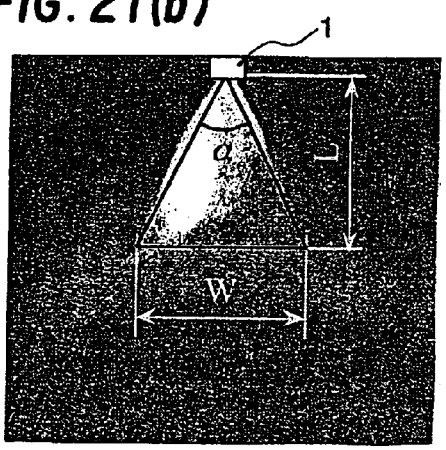

FIG. 21 shows a variation of the fuel spray angle according to the injection period. The fuel spray angle $\alpha$ is calculated according to the formula shown in the figure to express the characteristic of the fuel spray shape, in other words, by the formation of the triangle of the fuel spray width W at a point where the fuel spray is wound up at the immediately before of the injection finish and the length L of the fuel spray to a point where the wind-up of the fuel spray is caused.

In the fuel spray according to the prior art, in the atmospheric pressure when the injection period is become long it has a tendency that the fuel spray angle is become small. Further under the pressurization atmosphere the fuel spray angle is become narrow with 20–50% degree in comparison with that of the atmospheric pressure.

On the other hand, the fuel spray according to the present invention, under both the atmospheric pressure and the pressurization pressure, the variation of the fuel spray angle $\alpha$ defined by the above stated definition is small and the affect of the injection period is small.

Referring to FIG. 22 the variation of the fuel spray angle will be explained. Under the atmospheric pressure and under the pressurization pressure, the phenomenon in which the variation of the fuel spray angle is small is caused in the difference between the inner pressure and the outer pressure of the fuel spray.

The difference between the inner pressure and the outer pressure of the fuel spray will be explained according to Bernoulli's theorem as shown in the formula shown in the figure.

The fuel spray which has injected to the stationary atmosphere is grown by pulling up the surrounding air. When the air is pulled up, the pressure at the part of the pulled-up air is lowered, however in the case of the prior art, the air is supplied to the outside portion of the fuel spray from the surrounding portion. However, to the inside portion of the fuel spray since the air is not supplied, the pressure at the inside portion of the fuel spray is lowered.

When the pressure at the inside portion of the fuel spray of the fuel spray 100 is expressed by P1 and the pressure at the outside portion of the fuel spray of the fuel spray 100 is expressed by P2, it is obtained P1>P2, and in accordance with the difference between the inner pressure and the outer pressure of the fuel spray the force shown in a reference numeral 160 shown in the figure is caused and then the flow is formed.

Under the pressurization atmosphere the difference between the inner pressure and the outer pressure of the fuel spray is increased, for example, in the hollow conical shape fuel spray when the fuel spray under the atmospheric pressure is made as the standard, the pressurization atmosphere the difference between the inner pressure and the outer pressure of the fuel spray is calculated at the fuel spray at the atmospheric pressure of 0.5 MPa, it is understood that there is the difference of about 2.5 times.

As a result, under the pressurization atmosphere since the force for directing the inside portion is become strong, the fuel spray is pulled in the inside portion and the fuel spray angle is become narrow. In a case where the injection period is become long, similarly to the air amount which is pulled up by the fuel spray is increased. Since the difference between the inner pressure and the outer pressure of the fuel spray is increased, as a result the fuel spray angle is become narrow.

On the other hand, according to the present invention, the part of the fuel spray is cut off through the splitter and since the air introduction passage to the inside portion of the fuel spray is formed, the difference between the inner pressure and the outer pressure of the fuel spray is gotten off and the flow shown in the reference numeral 160 is not caused, the fuel spray angle is not varied in accordance with the injection period and the atmosphere pressure.

Figure 23:
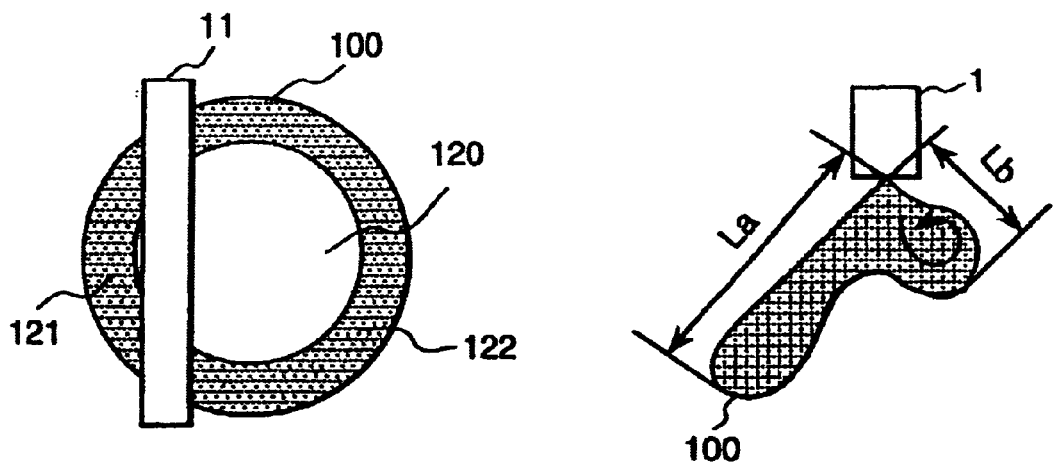
FIG. 23 is a schematic view showing a fuel spray shape in a direct injection type internal combustion engine of one embodiment according to the present invention.

To form the fuel spray 100 shown in FIG. 1, it is possible to make the off-set the position of the splitter 11 from the center of the injection port 8. FIG. 23 is a schematic view showing a relationship between the fuel spray 100 and splitter 11 taken from the lower portion of the fuel injector 1.

The fuel spray 100 has the hollow conical shape and this fuel spray 100 is divided into according to the splitter 11. In this case, when the splitter 11 is arranged at the position which is made the off-set from the center of the fuel spray 100 as shown in figure, to the inside portion of the fuel spray 100 which the divided area is remained largely as shown in a reference numeral 122, then the air flow from the air passage which is formed according to the splitter 11 is insufficient and then there is caused the difference between the inner pressure and the outer pressure of the fuel spray.

To an opposed side shown in a reference numeral 121, there is no difference between the inner pressure and the outer pressure of the fuel spray, the fuel spray is grown linearly, however the side in which the difference between the inner pressure and the outer pressure of the fuel spray is formed, the flow to the inside portion of the fuel spray is formed, as a result the penetration force is become small and also the fuel spray shown in the right side in FIG. 23 is formed.

Figure 24:
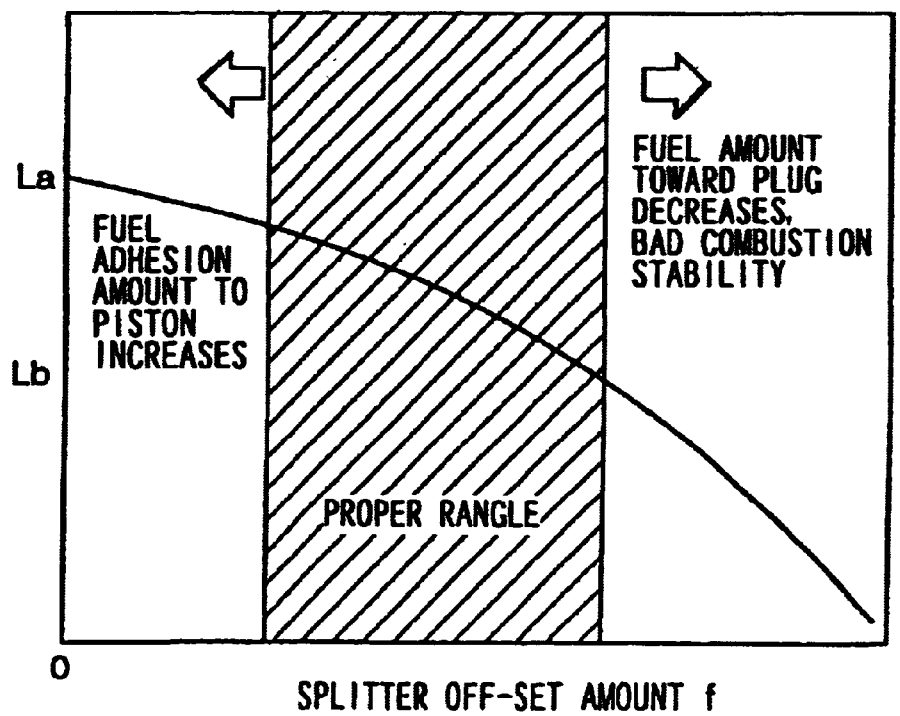
FIG. 24 is a view showing a relationship between an off-set amount of a splitter in a direct injection type internal combustion engine of one embodiment according to the present invention.

In FIG. 23, a length of the long fuel spray (the side of the strong penetration force) is expressed by La and a length of the short fuel spray (the side of the small penetration force) is expressed by Lb, a relationship between the length Lb and the off-set amount of the splitter is shown in FIG. 24.

In a case where there is no off-set the fuel spray is become equally in the right direction and the left direction, it is become La=Lb and accompanying with the largeness of the off-set amount since it is difficult to carry out the air introduction to the inside portion 120, the length Lb is reduced.

Herein, when the off-set is made small and the penetration force of the length Lb side is become strong, the fuel adhesion amount to the piston is increased, on the other hand, when the off-set is made large the length Lb can be reduced, however since the fuel amount for directing in the ignition plug is reduced, the combustion stability performance is become bad. Taking into the above stated circumstances, it is necessary to determine the off-set amount.

Figure 25:
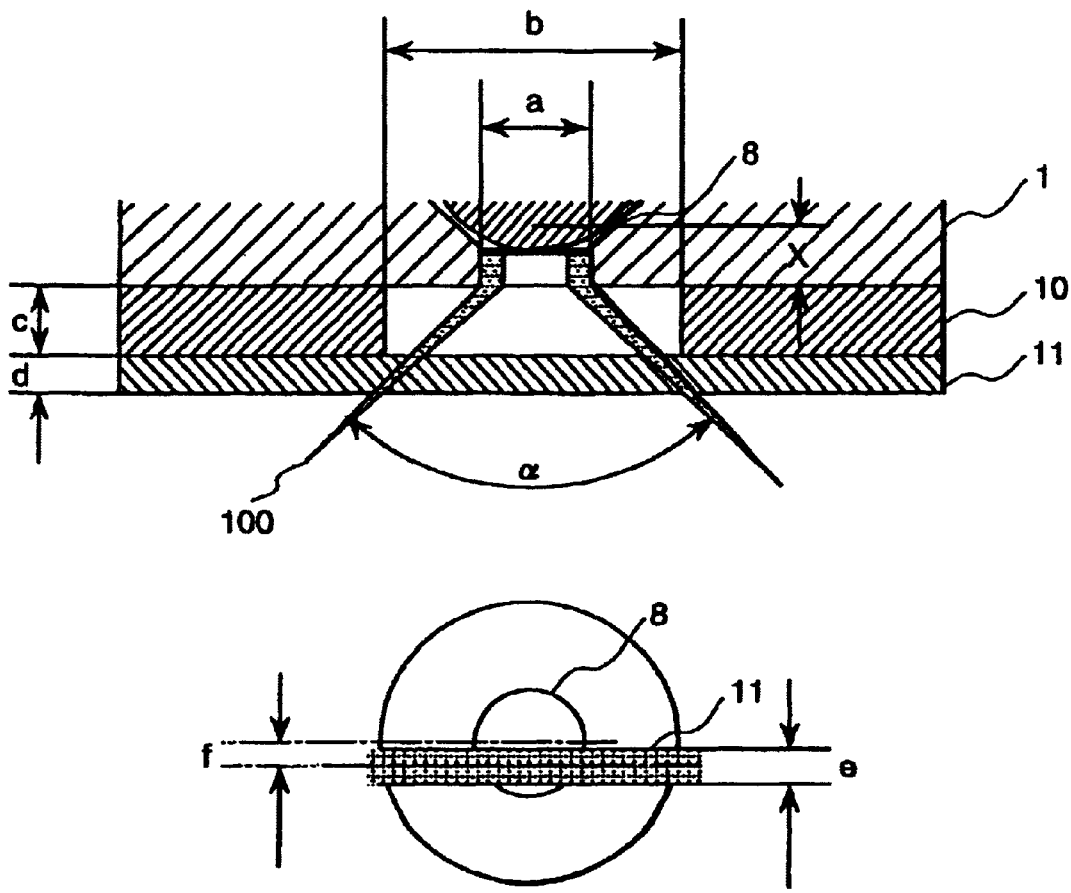
FIG. 25 is a view showing a relationship between sizes of a fuel injector in a direct injection type internal combustion engine of one embodiment according to the present invention.

FIG. 25 shows a relationship between the sizes of the injection port 8, the spacer 10, and the splitter 11. A diameter of the injection port 8 is expressed by a, a cavity diameter of the spacer 10 is expressed by b, a thickness of the spacer 10 is expressed by c, a thickness of the splitter 11 is expressed by d, a width of the splitter 11 is expressed by e, an off-set amount from the center of the injection port 8 is expressed by f, an angle of the fuel spray to be injected is expressed by $\alpha$ (defined in FIG. 21), and a distance from the apex of the fuel spray angle to an outlet of the injection port 8 is expressed by x, respectively.

The above stated these sizes are necessary to satisfy the formula shown in the figure. The formula 1 is defined about the hole diameter b of the spacer 10 and it is necessary to have the size in which from the injection port diameter a and the fuel spray angle $\alpha$, the fuel spray is not interfered with the spacer 10. In the formula 2, the width e of the splitter 11 is calculated according to the fuel spray angle $\alpha$ and the thickness c of the spacer 10.

The width d of the splitter 11 must have a value smaller than the diameter of the fuel spray when the fuel spray is reached to the splitter 11. The formula 3 is defined about the off-set amount f of the splitter 11 and this amount must have a value where the fuel spray is arranged to divide into from the diameter of the fuel spray and the width c of the splitter 11. The formula 4 is a calculation formula of the distance x used in other formula.

FIG. 26 is a view showing the splitter 11 in which the shape of the splitter 11 is formed using two cantilever beams. With this splitter 11 having the above stated shape, it is possible to divide the fuel spray and further there has a merit the fuel adhesion amount which is adhered to the splitter 11 can be reduced.

Further, a cross-section shape of the splitter 11 can be formed with a multi-angular column (including triangle column) and a circular column in addition to the quadrangle column. In comparison with the quadrangle column structure, in the triangular column structure and the circular column structure the resistance for giving the flow is little and it is possible to divide the fuel spray and then the loss in the energy can be reduced.

Further, the splitter 11 having the shape as shown in FIG. 27 is applied, without the off-set of the splitter 11 it is possible to have the largeness of the penetration force to the fuel spray. A cross-section shape of this splitter 11 is arranged to have the angle (in this figure 45 degree) the longest side of the triangle with the bottom face of the fuel injector.

With this structure, finally it is possible to divide the fuel spray with the largeness of the penetration force and then it is possible to give the difference in the penetration force. In this figure, the fuel spray at the left side has the strong penetration force.

Figure 28:
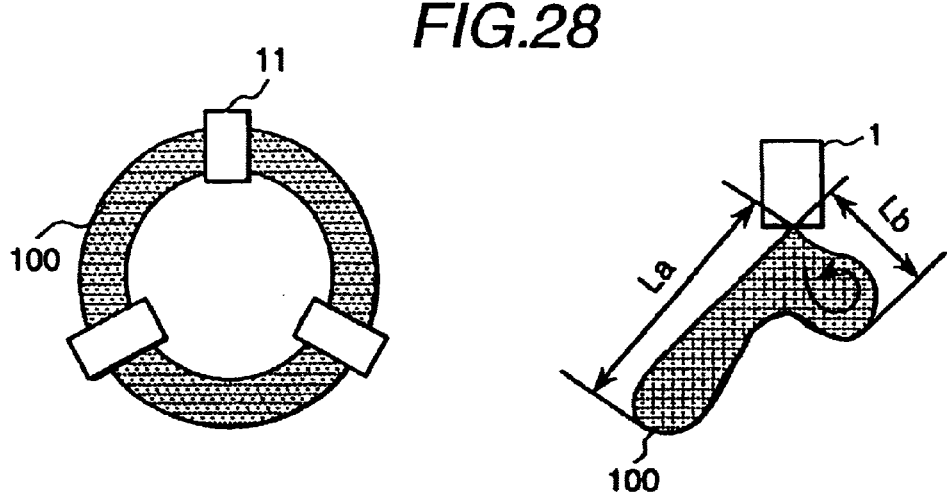
FIG. 28 is an arrangement view of a splitter structure in a direct injection type internal combustion engine of another embodiment according to the present invention.

FIG. 28 shows a case of the provision of three splitters. Since one side among the three divided splitter is used to direct for the ignition plug direction and an appearance La/Lb size can be made large.

Figure 29:
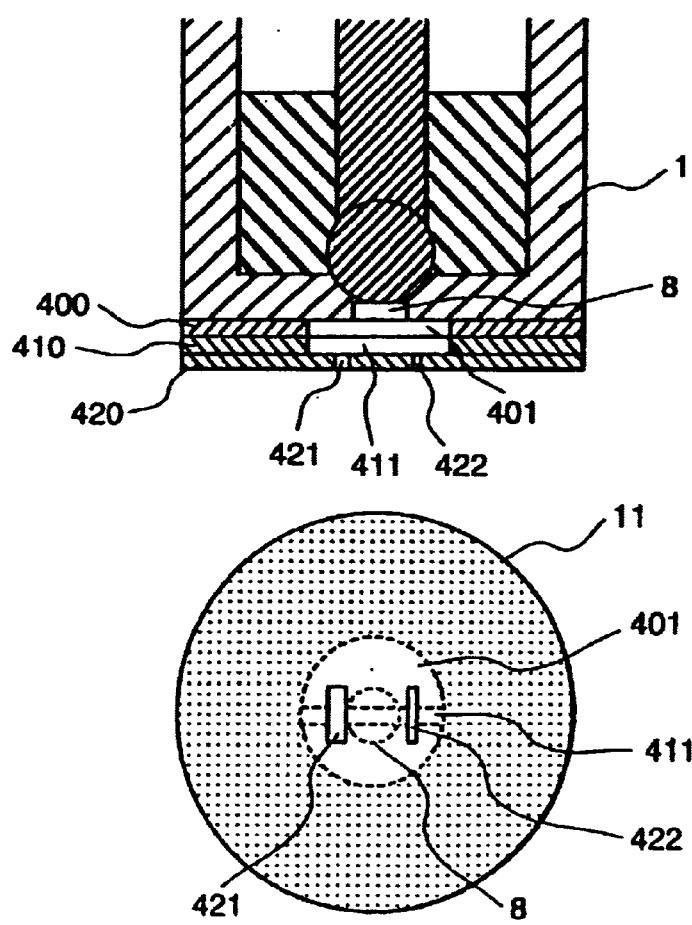
FIG. 29 is a cross-sectional view showing a fuel injector in a direct injection type internal combustion engine of one embodiment according to the present invention.

As shown in FIG. 29, to a tip end of the fuel injector several plates 400, 410 and 420, each having a thickness of several hundred microns, are installed. To this plate 400 a circular shape hole 401 having several mm, to the plate 410 a long slit 411 which is comprised of several microns and several mm, to the plate 420 a long slit having several mm and several hundred microns in the rectangular direction of the slit 411 and a slit 422 which is narrow width that of the slit 411 are provided respectively.

By the intervention of these various slits, the fuel is atomized and by the different widths of the slits, in the slit 421 the flow amount is become big, the penetration force is become strong and on the hand in the slit 422 the flow amount is become little and the penetration force can be formed weak.

Figure 30:
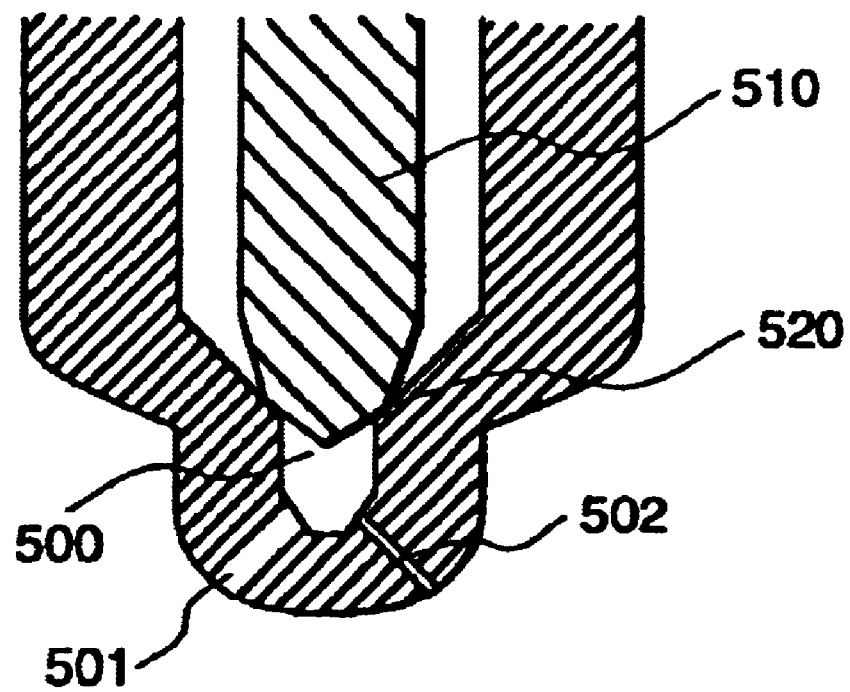
FIG. 30 is a cross-sectional view showing a fuel injector in a direct injection type internal combustion diesel engine of another embodiment according to the present invention.

In the structure shown in FIG. 30, as a fuel injector of a diesel engine, a suck 500 for reserving the fuel in the inside portion of the fuel injector is provided, and further an injection port 501 having a large diameter which is communicated to an outside portion from the suck 500 and an injection port 502 having a small diameter are provided.

In this structure, making the diameters of the injection ports 501 and 502 unequal, the fuel flow amount can be varied and to the shapes of the fuel spray the largeness of the penetration forces can be varied. The fuel spray at the injection port 501 side has the strong penetration force but the fuel spray at the injection port 502 side has the small penetration force.

As stated in above, with the simple structure in which the splitter etc. is provided to the tip end of the tumble atomization system fuel injector according to the prior art and then the fuel spray is divided, even under the pressurization atmosphere it is possible to maintain the wide fuel spray angle and further it is possible to form the fuel spray which has the strong penetration force at the ignition plug direction and the weak penetration force in the piston direction.

Since this spray is applied to the direct injection type internal combustion engine having the flat piston, the combustion stability performance and the fuel consumption can be improved and the discharge HC can be reduced and further the formation of the stratification at the high rotation area can be attained.

According to the present invention, the fuel adhesion amount to the piston can be reduced. Therefore, according to the present invention, there are effects in which the discharge HC can be reduced and further the fuel consumption can be improved.

What is claimed is:

1. A direct injection type fuel injector, comprising:

a fuel passage having a fuel injection port at an end portion;

a valve seat provided in a midway of said fuel passage;

a valve body for opening and closing said fuel passage by incorporating with said valve seat;

a tumble element for giving a tumble force to fuel which passes through between said valve body and said valve seat; and a fuel spray division means having a splitter which is provided on said fuel injection port at a position which is eccentrically from a center of said fuel injection port.

2. A direct injection type fuel injector according to claim 1, wherein said splitter is formed with a circular column or a multi-angle column.

3. A direct injection type fuel injector according to claim 1, wherein said splitter is divided at a center portion.

* * * * *